(12) United States Patent
Pedone et al.

(10) Patent No.: US 12,731,390 B2
(45) Date of Patent: Sep. 8, 2026

(54) SECURED TRANSFER INSTRUMENTS

(71) Applicant: Truist Bank, Charlotte, NC (US)

(72) Inventors: Jason Pedone, Raleigh, NC (US); Satya Prasanna Acharya, Cary, NC (US)

(73) Assignee: TRUIST BANK, Charlotte, NC (US)

( * ) Notice: Subject to any disclaimer, the term of this patent is extended or adjusted under 35 U.S.C. 154(b) by 551 days.

(21) Appl. No.: 18/296,815

(22) Filed: Apr. 6, 2023

(65) Prior Publication Data

US 2024/0338935 A1 Oct. 10, 2024

(51) Int. Cl.

*G06V 10/82* (2022.01)
*G06T 5/00* (2024.01)
*G06V 10/20* (2022.01)

(52) U.S. Cl.

CPC ................ *G06V 10/82* (2022.01); *G06T 5/00* (2013.01); *G06V 10/20* (2022.01)

(58) Field of Classification Search

CPC ........ G06V 10/82; G06V 10/20; G06V 20/62; G06V 20/60; G06V 30/10; G06V 30/40; G06V 30/19173; G06V 30/19107; G06V 30/191; G06V 30/19; G06T 5/00; G06T 7/0002; G06T 11/10; G06Q 20/00; G06Q 20/30; G06Q 20/042; G06Q 20/04; G06Q 20/32; G06Q 20/401; G06Q 20/40; G06Q 20/38; G06F 40/40

See application file for complete search history.

(56) References Cited

U.S. PATENT DOCUMENTS 7,835,942 B1 * 11/2010 Pavlic .................... G06Q 20/04 705/16
8,708,227 B1 4/2014 Oakes, III et al.
9,742,793 B2 * 8/2017 Bryant ................ G06F 21/6245
10,489,439 B2 11/2019 Calapodescu et al.
10,552,810 B1 2/2020 Ethington et al.
10,560,845 B1 * 2/2020 Manepalli ............... H04L 63/08
11,003,937 B2 * 5/2021 Uppal ................ G06V 30/1463
11,295,377 B1 4/2022 Ethington et al.

(Continued)

FOREIGN PATENT DOCUMENTS

WO WO-2020093165 A1 * 5/2020 ......... G06F 21/6254

OTHER PUBLICATIONS

Jha; Mukesh et al. "Automation of Cheque Transaction using Deep Learning and Optical Character Recognition", Nov. 2019, IEEE (Year: 2019).*

(Continued)

*Primary Examiner* — John Villecco
*Assistant Examiner* — Alejandro Hernandez
(74) *Attorney, Agent, or Firm* — Michael A. Springs, Esq.; Shumaker, Loop & Kendrick, LLP; Patrick B. Horne

(57) ABSTRACT

Disclosed are systems and methods for generating electronic instruments that implement digital transfers. The systems convert instruments to an electronic format using a digital imaging source that outputs image data. The image data is processed to determine content elements and segments of the electronic instrument and to extract transfer data. Neural networks implement artificial intelligence and machine learning technology that is used to secure the transfer instrument and detect inconsistencies or errors in the data.

16 Claims, 13 Drawing Sheets

(56) References Cited

U.S. PATENT DOCUMENTS

2006/0156385 A1* 7/2006 Chiviendacz ......... H04L 9/3271 726/2
2007/0211942 A1* 9/2007 Curtis .................. G06F 18/254 382/181
2009/0006233 A1* 1/2009 Chemtob ............... G06Q 20/10 705/35
2009/0070263 A1* 3/2009 Davis ................... G06Q 20/322 705/44
2010/0260408 A1 10/2010 Prakash et al.
2011/0016327 A1* 1/2011 Suzuki ................ H04L 63/0861 713/186
2012/0087587 A1* 4/2012 Kacher ................ G06V 30/162 382/182
2012/0311684 A1* 12/2012 Paulsen ............. G06Q 20/4014 726/6
2016/0248830 A1* 8/2016 Jaynes .................... H04L 63/08
2016/0352769 A1* 12/2016 Bryant ................ H04L 63/1433
2017/0300876 A1* 10/2017 Musiala, Jr. ........... G06Q 40/02
2017/0323279 A1* 11/2017 Dion ....................... G07F 19/20
2018/0307590 A1* 10/2018 Padhi ................... G06V 30/416
2019/0102653 A1* 4/2019 Agarwal ................ G06V 10/20
2019/0114743 A1* 4/2019 Lund ...................... G06V 10/82
2019/0188524 A1* 6/2019 He .......................... G06F 18/28
2019/0354756 A1* 11/2019 Goubalan ........ G06V 30/18086
2020/0311467 A1* 10/2020 Srivastava ............... G06N 3/09
2020/0311708 A1* 10/2020 Bermudez .......... G06Q 20/4016
2020/0327351 A1* 10/2020 Abedini ................. G06N 20/00
2021/0012145 A1* 1/2021 Chaudhari ......... G06Q 30/0241
2021/0117668 A1* 4/2021 Zhong .................... G06N 20/00
2021/0295103 A1* 9/2021 Tanniru .................. G06V 10/82
2022/0067940 A1* 3/2022 Heng ................... G06N 3/0464
2022/0414661 A1* 12/2022 Hassanzadeh ......... G06N 3/098
2023/0224162 A1* 7/2023 Gallagher ............. H04L 63/126 713/176
2023/0351782 A1* 11/2023 Fitzgerald .............. G06V 30/42
2024/0062560 A1* 2/2024 Long .................. G06V 30/1448
2024/0121276 A1* 4/2024 Levering ................. H04L 63/08
2024/0193601 A1* 6/2024 Kuiper .................. H04L 9/3247
2024/0281944 A1* 8/2024 Jayaraman ............. G06V 10/82
2024/0296688 A1* 9/2024 Franklin .............. G06Q 20/042
2025/0022301 A1* 1/2025 Long ................ G06V 30/19173
2025/0238802 A1* 7/2025 Edwards ................ G06Q 20/34
2025/0371900 A1* 12/2025 Poloju .................... G06V 10/82

OTHER PUBLICATIONS

Truist Bank; Inventor Raphael Fitzgerald; U.S. Appl. No. 17/815,706, filed Jul. 28, 2022. Title: Method for Identifying Handwritten Characters on an Image Using a Classification Model.

Muhammad Mahbubur Rahman and Tim Finin; Deep Understanding of a Document's Structure; © 2017 Copyright held by the owner/author(s). ISBN 978-1-4503-5549-0/17/12 DOI: https://doi.org/10.1145/3148055.3148080; 11 pages.

* cited by examiner

502

124

224

524

520

510

509

508

512

504

514

516

506

SECURED TRANSFER INSTRUMENTS

TECHNICAL FIELD AND BACKGROUND

The present invention relates generally to the field of automated electronic transfer instrument creation, error detection and security, and more particularly, to systems that utilize artificial intelligence and machine learning technology to automate the creation of electronic transfer instruments while enhancing security and error detection.

Conventional techniques for digital transfer execution require manually generating and authorizing transfer instruments before sending the transfer instrument to a remote entity for processing. Inconsistencies or errors in a transfer instrument are often not detected until hours or days later after the transfer instrument has been transmitted to the remote entity. Transfer are, therefore, often placed on hold while a manual review is conducted resulting in detrimental delays.

To address the drawbacks of conventional techniques, the present systems automate the generation of electronic transfer instruments while utilizing artificial intelligence technology and machine learning to secure the transfer instrument and detect inconsistencies and errors in real time without delay. Moreover, the present systems operate in parallel with conventional, manual transfer techniques to provide seamless onboarding and transition from legacy systems and to allow replacement or supplementation of existing techniques.

SUMMARY

The system can generate electronic transfer instruments using image data captured by an imaging device, such as a camera or scanner. The image data is processed using a variety of techniques to read and convert the information contained in the transfer instrument, which includes typed and handwritten text, into machine encoded content elements. The content elements, which can be individual characters, are grouped into tokens (e.g., words or groups of words) that represent transfer data. The transfer data is used to implement the electronic transfer and can include information, such as a source identification (i.e., the transferor), a target identification (i.e., the transfer recipient), or transfer value data (i.e., the amount of the transfer).

In some embodiments, the system can segments transfer instruments into logical segments or components of the transfer instrument. The results of the segmentation is used to determine the types of transfer data represented by machine encoded content elements. For example, a group of machine encoded content elements can represent a source identification that is expected to be located within a particular component segment of the transfer image.

The electronic transfer image provides particular advantages of enabling automated validation of transfer data or augmentation data that comprises the electronic transfer instrument. The systems can readily extract and process transfer data and compare the data to known values to validate the transfer data, thereby enhancing security and accuracy. Digitizing such information also provides the advantage of automated validation and secure processing.

In one embodiment, a system for electronic transfer instrument security and error detection includes a computer with at least one processor and a memory device that stores data and executable code. The executable code causes the processor to transmit system configuration data to a network computer that compares the system configuration data to stored system configuration data and returns end user data. The system configuration data is unique to the computer being operated by user and can be used to verify the computer and user identity. The system returns end user data, such as a user identification or user product identification (e.g., account numbers).

The system activates a camera integrated or connected with the computer. The camera captures image data that comprises a transfer instrument image. The image data is read and converted to machine encoded content elements, such as handwritten or typed text characters, to identify text on the transfer instrument image. The transfer instrument is segmented into various components where transfer data can be found, such as a component for displaying a target identifier and another component where the value of the transfer is recorded. Each component comprises a map index corresponding to a location of the component within the transfer instrument image, and at least some components include transfer data elements.

The computer extracts transfer data elements from the transfer instrument image where the computer uses the map index to locate a component, and then reads the machine encoded content elements from the component. The computer then converts groups of machine encoded content elements to an extracted transfer data element. The computer utilizes the transfer data, end user data, and transfer activity data relating to an end user's prior transactions to secure the transfer instrument by detecting indicators of fraud, errors, or inconsistencies called transfer tags. In particular, the computer determines a Secure Score that corresponds to a likelihood that the transfer instrument is, or is not, fraudulent or erroneous such that it should not be processed. The system includes a Secure Agent that determines the Secure Score to detect indicators of fraud or errors through the use of artificial intelligence and machine learning technology.

In some embodiments, the system includes a Deposit Service Router that routes processing of transfer instruments through a Legacy Path, Onboard Path, or Active Path depending on parameters stored to the Parameters and Thresholds database. Once a transfer instrument is secured, it is passed to the Deposit Platform for posting and recording.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
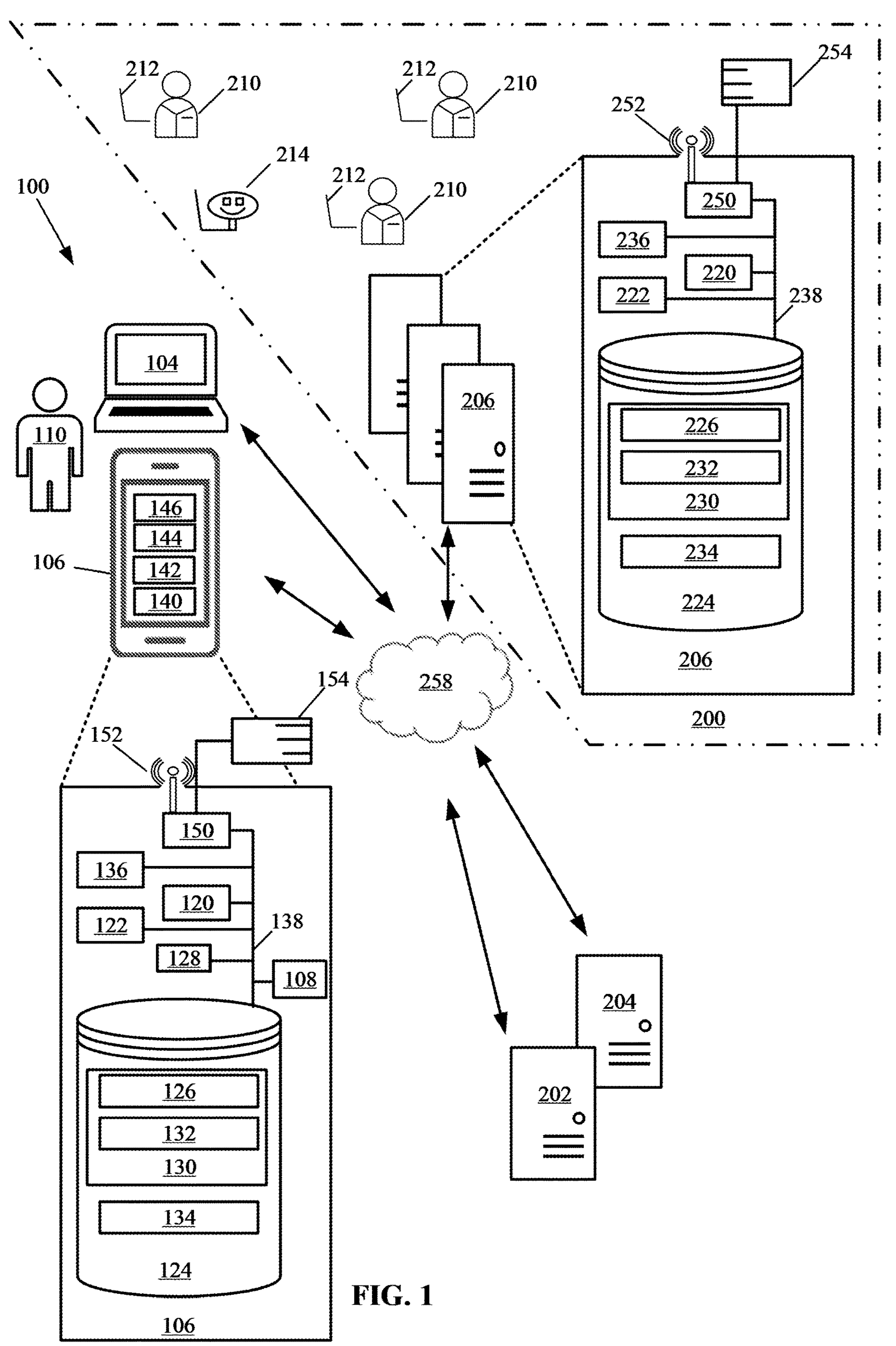
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. The term "user" is used interchangeably with the terms end user, customer, or consumer, and these terms represent individuals to whom a provider is rendering goods or services or individuals and/or with whom the provider has an ongoing relationship.

The term electronic augmentation is used synonymously with the terms "virtual endorsement," or "virtual marking," and the term includes an electronic signature or other information used to securely authorize an electronic transfer as well as instructions used to process the electronic transfer. The term transfer instrument denotes a tangible or intangible record that includes information required to authorize and institute an electronic transfer, as discussed more fully below.

Embodiments are described with reference to flowchart illustrations or block diagrams of methods or apparatuses where each block or combinations of blocks can be implemented by computer-readable instructions (i.e., software). The term "apparatus" includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs. or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 & 106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth® or Near-field communication ("NFC") protocols. Communications may also or alternatively be conducted via the connector 154 for wired connections such by universal serial bus ("USB"), Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

Machine learning technology can utilize supervised software processing techniques or unsupervised software processing techniques. Supervised software processing relies on iterative training techniques and training data to configure neural networks with an understanding of various types of data inputs. As an example, training data is utilized to train a neural network to recognize various categories of data inputs, such as labeling resource transfer data according to a purpose for which the resources were transferred.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance but only when enough labeled data is available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of data that the system will process in a production environment. Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT").

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM").

Clustering software techniques can automatically group similar data together to accelerate the derivation and verification a new classification or subject, and not just classification into an existing subject or classification. Unsupervised learning software systems are also used for association rules mining to discover relationships between features from content data. Unsupervised learning software systems can be less accurate than well-trained supervised systems, but such software systems have the advantage of avoiding the need for large, carefully labeled sets of training data that are processed by expert personnel.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (e.g., DBSCAN), mean shift clustering, expectation maximization (e.g., EM) clustering using Gaussian mixture models (e.g., GMM), agglomerative hierarchical clustering, or the like. In one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Figures 2A, 2B, 2C:
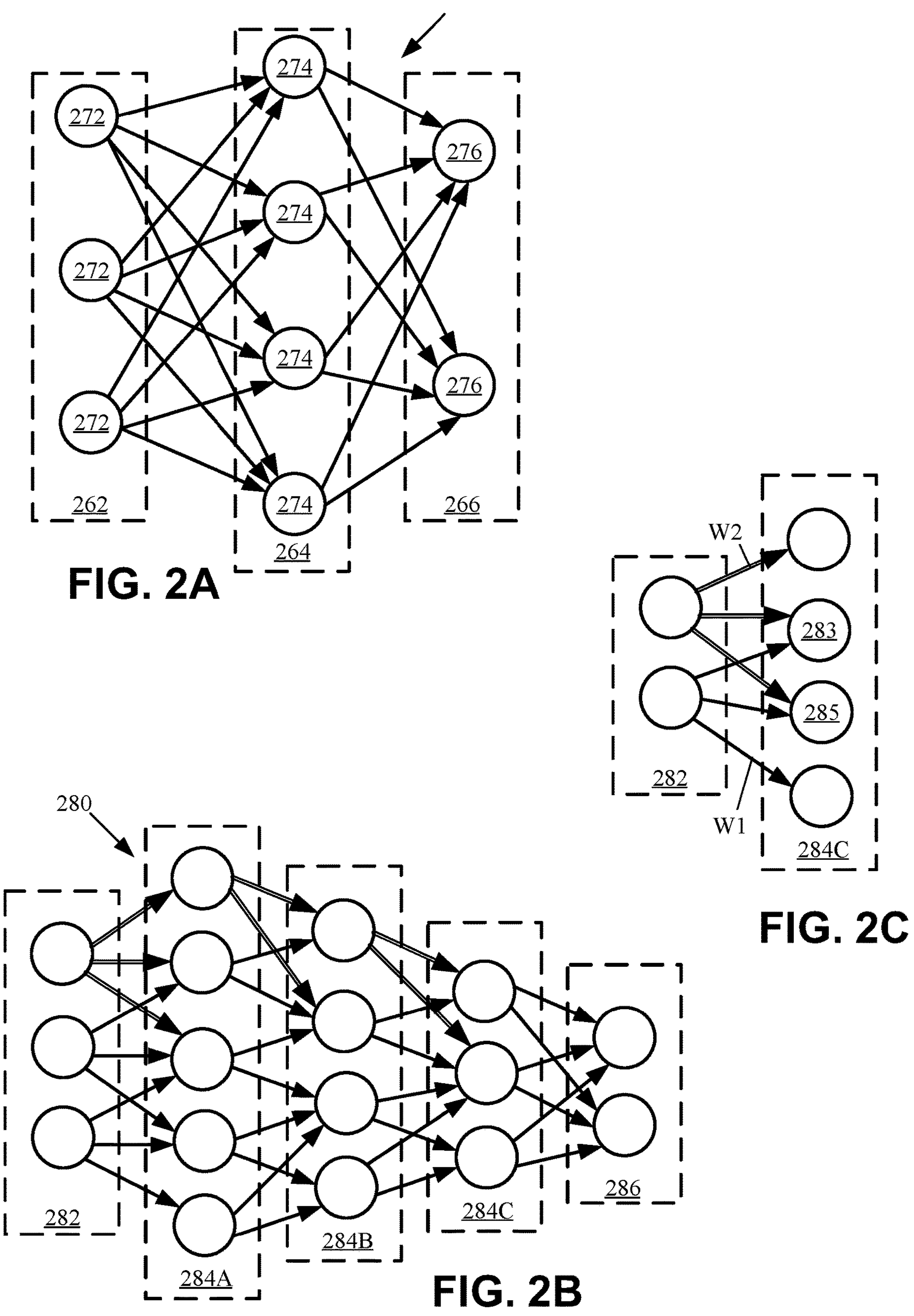
FIG. 2A is a diagram of a feedforward network, according to at least one embodiment, utilized in machine learning.
FIG. 2B is a diagram of a convolution neural network, according to at least one embodiment, utilized in machine learning.
FIG. 2C is a diagram of a portion of the convolution neural network of FIG. 2B, according to at least one embodiment, illustrating assigned weights at connections or neurons.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is performed.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT").

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Unsupervised learning software systems can perform training operations on unlabeled data and less requirement for time and expertise from trained data scientists. Unsupervised learning software systems can be designed with integrated intelligence and automation to automatically discover information, structure, and patterns from content data.

Unsupervised learning software systems can be implemented with clustering software techniques that include, without limitation: (i) K-mean clustering; (ii) Mean-Shift clustering; (iii) density based special clustering of applications with noise (e.g., DBSCAN); (iv) spectral clustering; (v) Principal Component Analysis; (vi) Neural Topic Modeling ("NTM"); (vii) expectation maximization (e.g., EM) clustering using Gaussian mixture models ("GMM"); (viii) agglomerative hierarchical clustering; (ix) Hopefield Networks; (ix) a Boltzmann Machines; (x) a Sigmoid Belief Net; (xi) Deep Belief Networks; (xii) a Helmholtz Machine; (xiii) a Kohonen Network where each neuron of an output layer holds a vector with a dimensionality equal to the number of neurons in the input layer, and in turn, the number of neurons in the input layer is equal to the dimensionality of data points given to the network; (xiv) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (xv) a Centroid Neural Network that is premised on K-mean clustering software processing techniques.

Clustering software techniques can automatically group similar data together to accelerate the derivation and verification a new classification or subject, and not just classification into an existing subject or classification. In one embodiment, clustering may be performed using a cluster model to group data points based on certain similarities using unlabeled data. Example cluster models may include, for example, connectivity models, centroid models, distribution models, density models, group models, graph based models, neural models and the like.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
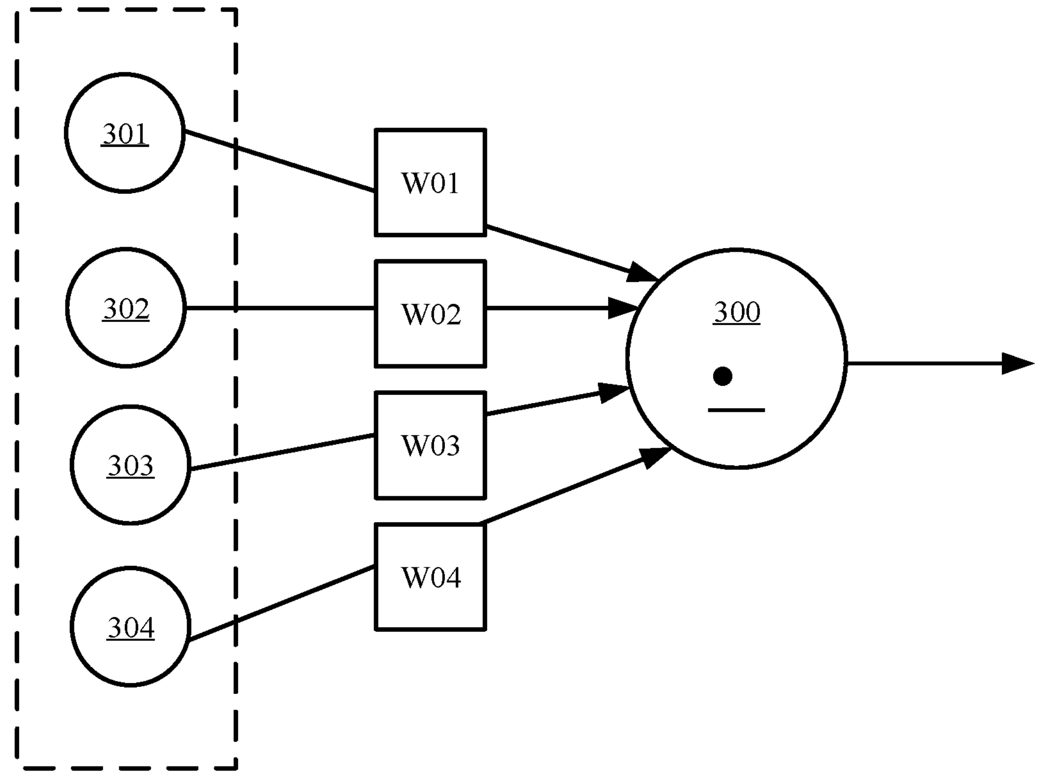
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). A RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous network layers.

Figure 4:
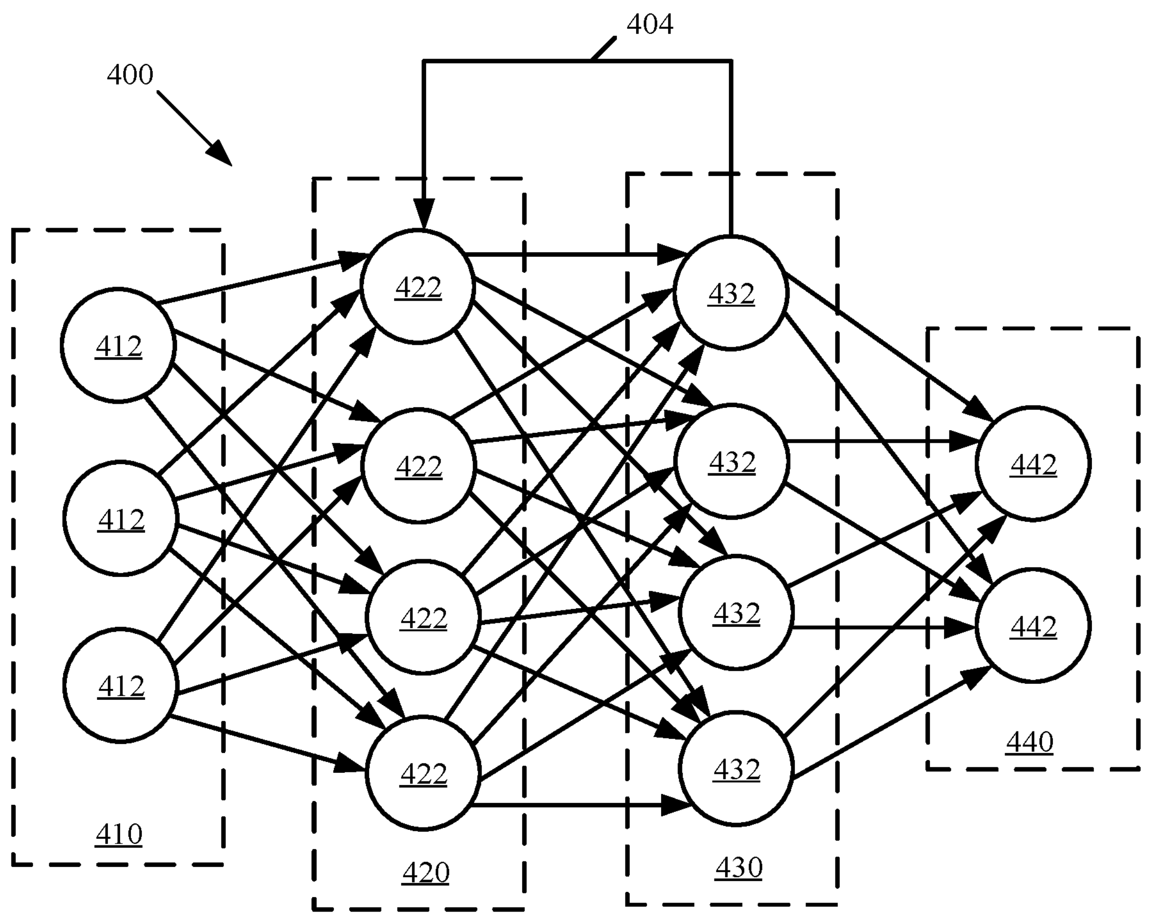
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images.

According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
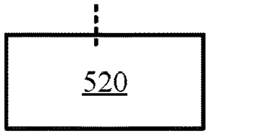
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation, such as natural language processing). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Different neural network architectures can be more particularly suited for particular uses to process different types of data inputs and render specific outputs. For example, different neural network architectures can be better suited to perform natural language processing and topic modeling while other types of neural network architectures are more well suited for predictive modeling of future expected data.

To implement natural language processing technology, for example, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) LSTM network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

To perform predictive analysis of expected future values of data, suitable neural network architectures can include various deep-learning techniques and specific architectures that include, but are not limited to: (i) LSTM network architecture; (ii) deep-learning, cyclic recurrent neural networks; (iii) an Elman recurrent neural network; (iv) convolutional neural networks; (v) multilayer perceptron networks; (vi) TensorFlow networks; (vii) MxNet networks; (viii) PyTorch networks; (ix) Keras networks; and (x) Gluon networks.

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on Kmeans clustering software processing techniques.

Figure 6:
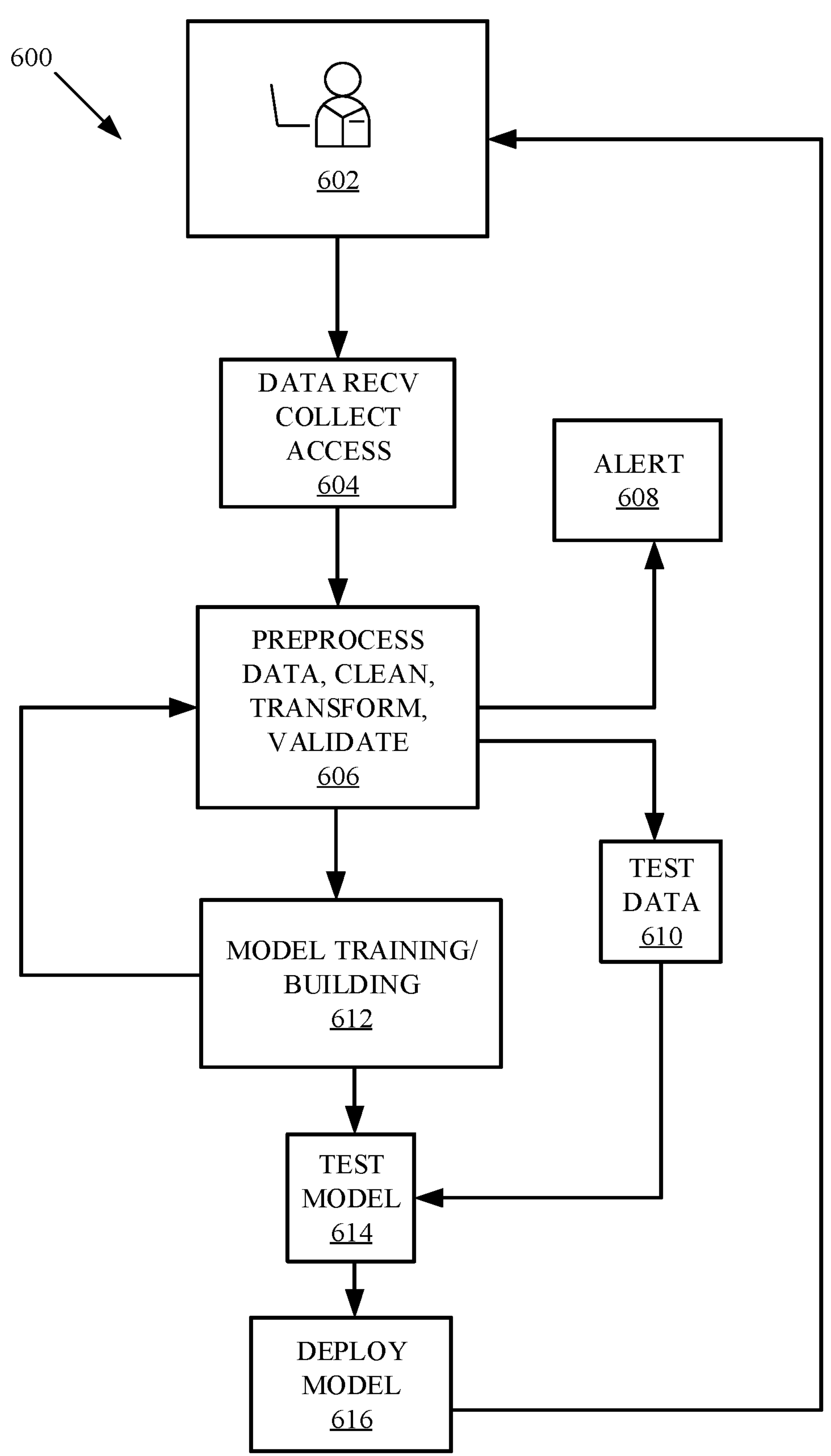
FIG. 6 is a flow chart representing a method model development and deployment by machine learning.

Turning to FIG. 6, a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is preprocessed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation to confirm that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Recognizing Content Elements and Image Processing

Figure 7:
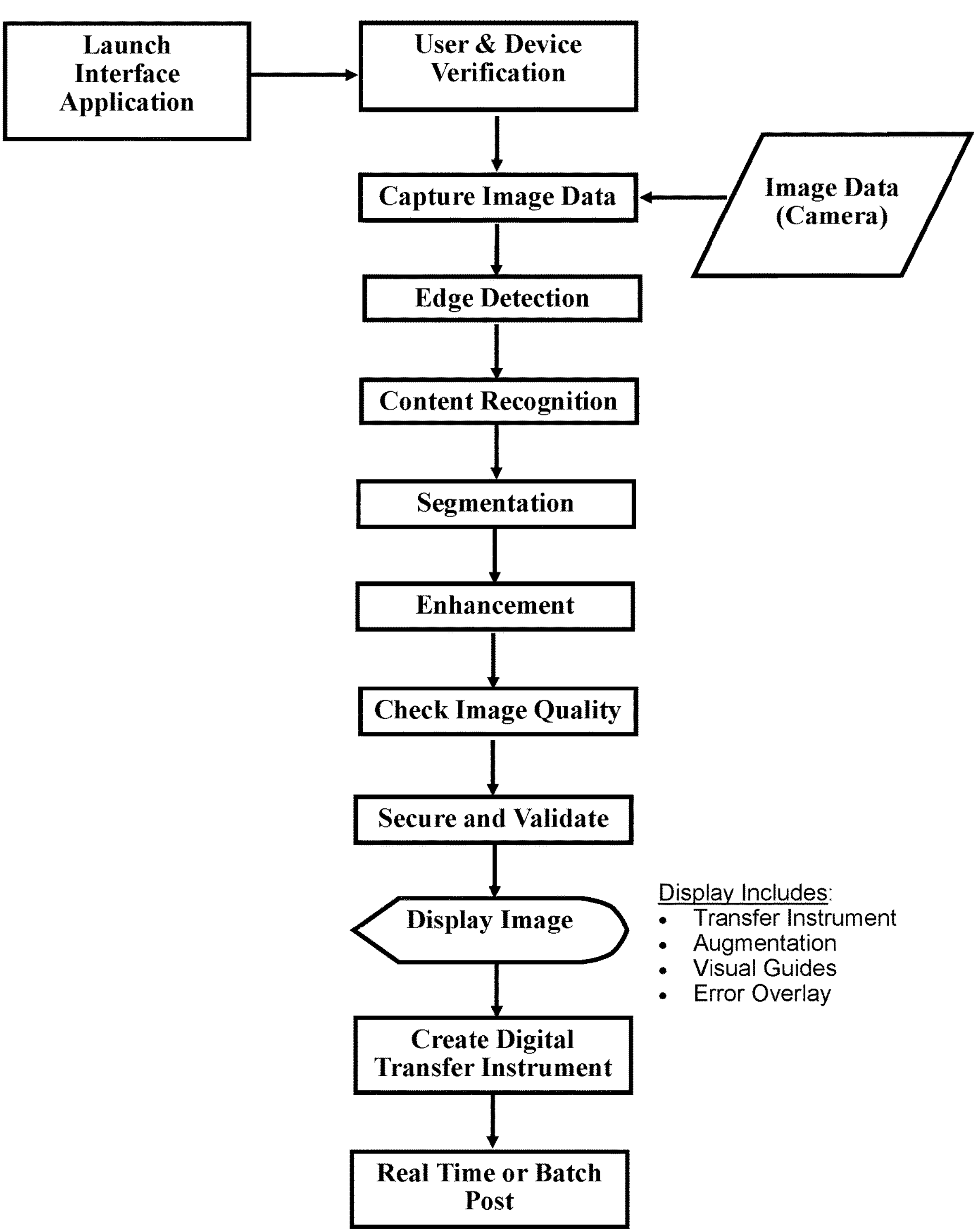
FIG. 7 is an example process for generating an electronic transfer instrument according to one embodiment.
Figure 8:
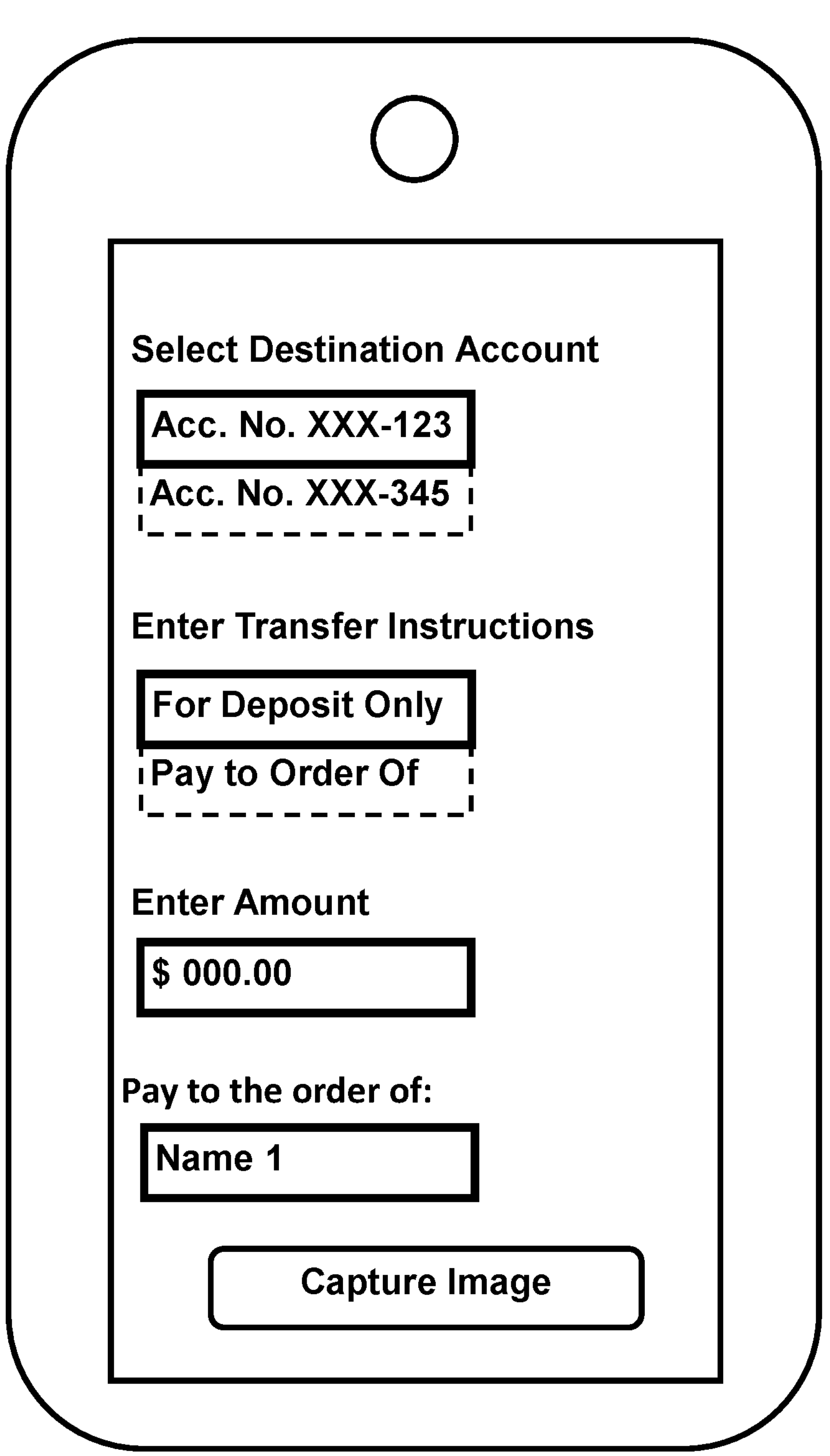
FIG. 8 is an example user interface for entering transfer data according to one embodiment.
Figure 9:
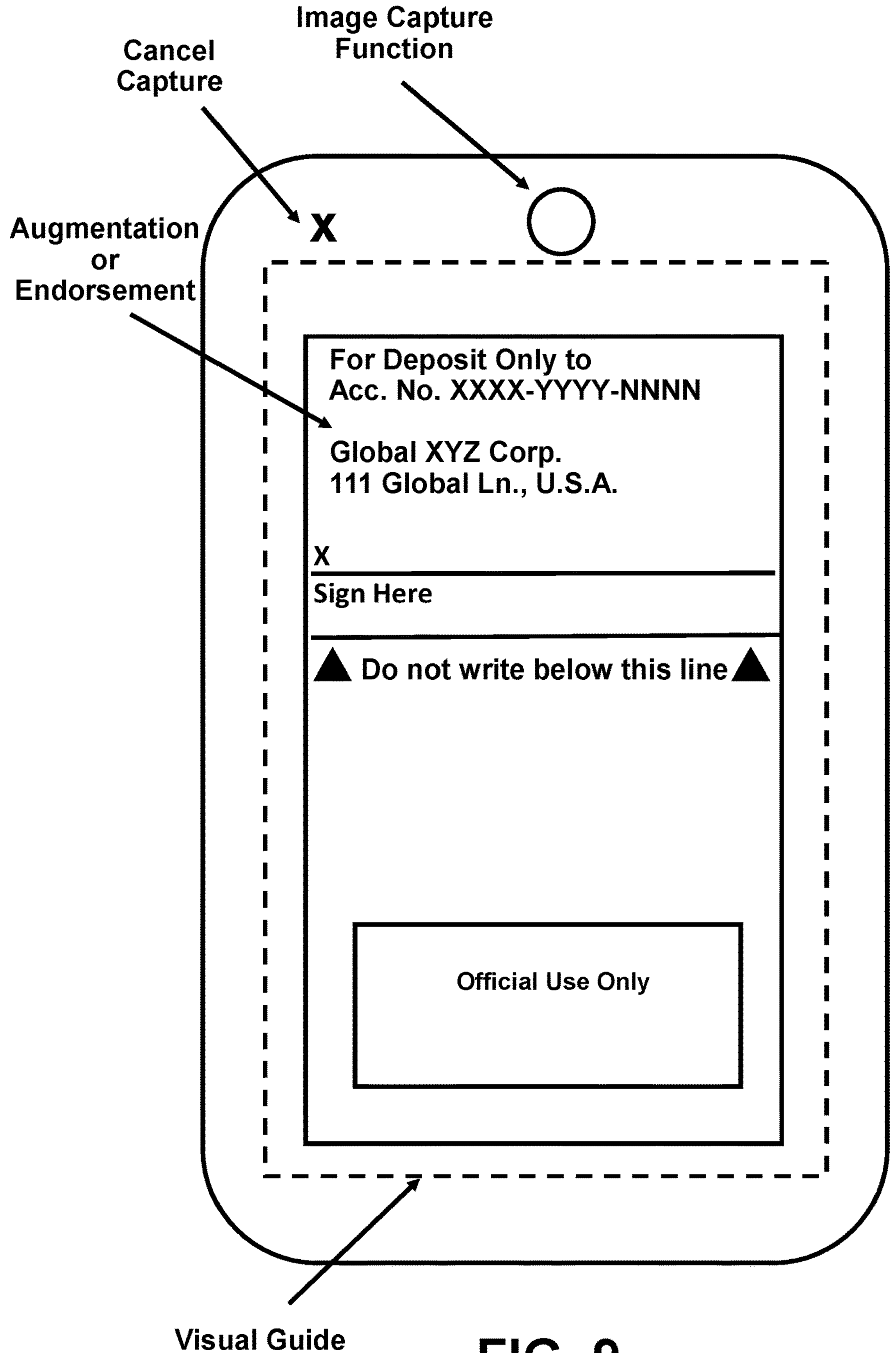
FIG. 9 is an example user interface for image capture and showing electronic augmentations according to one embodiment.
Figure 10:
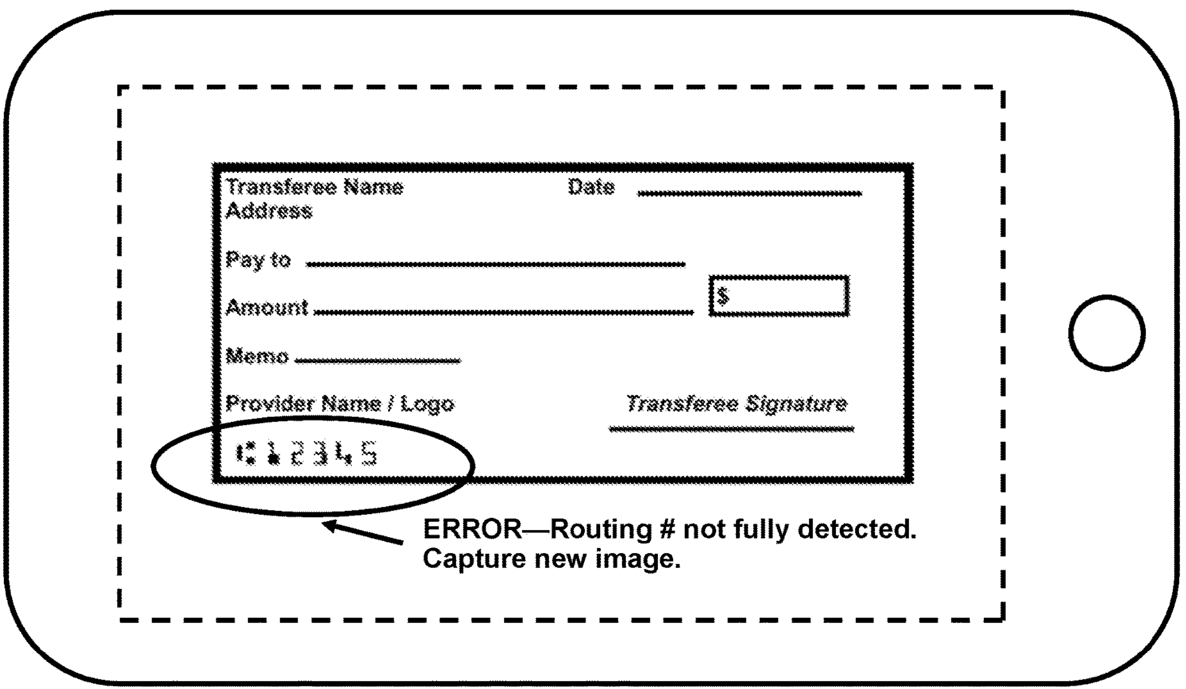
FIG. 10 is an example user interface for image capture according to one embodiment.

The present systems and methods read, record, and create electronic transfer instruments based on image data captured or generated from a camera, scanner, or other device. An example process flow for capturing image data is shown in FIG. 7 and example interfaces for capturing image data are shown in FIGS. 8 through 10. The image data can be stored in one or more various image formats, such as a Joint Photographic Experts Group ("JPEG") compliant format, a tabbed image file ("TIFF") format, a bitmap format, or a Scalable Vector Graphics ("SVG") image format. In some embodiments, the electronic transfer instrument can be converted to, and stored as, a portable document format ("PDF").

The system processes the image data using a content recognition analysis to determine individual machine encoded content elements in the data, such as letters, numbers, characters, or symbols. To ensure human and machine readability of the image data, the system can include an Image Processing Module software component integrated with the user computing device or integrated with a provider device that performs one or more image enhancement operations. The enhancement operations can improve the accuracy of content recognition analyses that employs techniques such as edge detection, optical character recognition ("OCR"), intelligent character recognition ("ICR") that uses artificial intelligence techniques to recognize characters, magnetic ink character recognition ("MICR"), courtesy amount recognition ("CAR"), or legal amount recognition ("LAR").

Enhancement operations include, but are not limited to, one or more of the following functions: (i) de-skewing an image where the edges of the transfer instrument are rotated relative to the boundaries of the image (i.e., re-orienting the transfer instrument image to better align with the image boundaries); (ii) de-warping the image when the transfer instrument is tilted or folded such that some portions of the transfer instrument are closer to the camera than other portions (i.e., modifying portions of the transfer instrument image so that the transfer instrument appears to be perpendicular to the camera lens); (iii) binarization to convert the image to black-and-white pixels; (iv) de-speckling to remove positive and negative spots and to smooth edges present in the image; (v) line removal to eliminate non-glyph lines or shapes (i.e., shapes that do not form part of a character, such as inadvertent pen strokes); (vi) cropping pixels or portions of an image outside of the transfer instrument; (vii) down-sizing the image to a more suitable dots-per-square-inch ("DPI") size that is more efficient to process and transmit over a network; (viii) character segmentation to separate individual characters that might be linked by artifacts in an image (e.g., a hand-written cursive word that links characters, a user-inserted hyphen, or a stain or dark spot between characters that appears to improperly connect the characters); (ix) line and word detection; (x) script recognition to detect characters unique to particular fonts or languages that can be more efficiently compared against a known database of characters of the same language or font to identify the characters; and (xi) de-noising an image to reduce abrupt changes in pixel values throughout an image.

With respect to de-skewing, de-warping, and de-speckling operations, the Image Processing Module can employ techniques such as: (i) convex-hull algorithms that create a smooth polygon around the transfer instrument image and remove concavities; or (ii) a rotating calipers algorithm that determines the tightest fitting rectangle around the transfer instrument edges that can be used to determine the orientation angle of the transfer instrument to better align the transfer instrument with the image boundaries.

Following image enhancement operations, the Image Processing Module processes the image data that represents the transfer instrument using a content recognition analysis. The content recognition analysis locates and identifies the human-readable characters on the transfer instrument that form transfer data. The content recognition analysis can employ OCR or ICR processing techniques that generally include two methods: (i) component detection that defines a character by evaluating individual components such as lines and strokes; and (ii) pattern recognition that identifies entire characters. Both OCR and ICR techniques are generally referred to herein as OCR or character recognition techniques.

Content recognition techniques can include both traditional image processing to model-based detection. Image processing-based content recognition methods include Stroke Width Transform ("SWT") and Maximally Stable Extremal Regions ("MSER") that extract text regions based on edge detection and extremal region extraction, respectively. Deep-learning model-based software techniques may include Connectionist Text Proposal Network ("CTPN") and Efficient and Accurate Scene Text Detector ("EAST").

Once the transfer instrument image preprocessed and analyzed to determine constitute components or segments, the content recognition analysis is either applied directly, or a further feature extraction stage may be applied. Deep learning-based solutions combine both feature extraction and content recognition in a single model. For input in the form of images, convolutional neural networks yield suitable results. Due to the sequence nature of text, a combination of Convolutional Neural Networks and bidirectional Long Short-Term Memory based Recurrent Neural Networks can also be applied as a basis for a content recognition software service. The final output of the bidirectional LSTM layers can be fed into Connectionist Temporal Classification ("CTC") layer to convert the sequence into feature vector ready for word classification.

In one embodiment useful for handwritten content recognition, the system groups consecutive strokes recognized in the image data. This results in a component graph where each node corresponds to at least one character hypothesis and where adjacency constraints between characters are handled by the node connections. Nodes are considered adjacent if the corresponding hypotheses have no common stroke but whose strokes are consecutive in the original input data.

The system can include a database of machine encoded content element character candidates with probabilities or recognition scores for each node of the component graph. These probabilities or recognition scores are based on a machine encoded content element recognition information database. The machine encoded content element recognition information database defines all the different characters and symbols of an alphabet underlying to the specified language. This information is language dependent and comprises general differences in alphabets as well as the ability to recognize various individual styles of writing the alphabets.

A first step in content recognition for one example embodiment can be based on a combination of dynamic and static features. The dynamic features can be extracted from the trajectory of the input stroke and are based on information such as position, direction, and curvature of the input stroke. Static features can be extracted from a bitmap representation of the input stroke and can be based on projections and histograms.

A second stage of content recognition can be classification of the features extracted by a pattern classifier such as a neural network. The neural network can be a multilayer perceptron or include an extra class enabling the neural network to reject node hypotheses corresponding to badly segmented characters. The system generates a list of character candidates with probabilities or recognition scores for each node of the segmentation graph. An alternative embodiment might make use of another kind of neural network such as Deep Neural Network, Convolutional Neural Network, or Recurrent Neural Network. Other types of pattern classifiers could be used to address content recognition tasks, such as a support vector machine or a hidden Markov model.

The system generates linguistic meaning for the different paths in the component graph. The system checks candidates according to the machine encoded content element information available in a database. The machine encoded content element information can include a lexicon, a regular expressions, or the like. The system processes the image data to find the best recognition path or a recognition path having the lowest cost. Cost can be estimated from the probabilities or recognition scores of each node belonging to a path in the component graph. In one embodiment, the costs are estimated from the neural network probabilities by applying a logarithmic, non-linear function.

In one embodiment, the system does this by exploring a language model such as final state automaton (e.g., a determinist FSA) representing the content of linguistic information. In some embodiments, the system can utilize statistical information modeling for how frequent a word or a given sequence of words appears in the specified language or is used by a specific user. For instance, a word tri-gram language model may be used to evaluate the linguistic likelihood of the interpretation of a given path of the segmentation graph.

The first step in character recognition analysis is typically to convert image data to black-and-white pixels that are represented by a two-dimensional matrix. Within the matrix, a "1" denotes a black pixel, and a "0" denotes a white pixel. The Image Processing Module identifies regions of the matrix that represent a character, and segments the matrix regions surrounding a character into sub-region segments. The Image Processing Module compares each matrix sub-region segment to a database of matrices representing characters with different fonts. The comparisons are used to identify a character that the matrices most resemble statistically.

Figure 11:
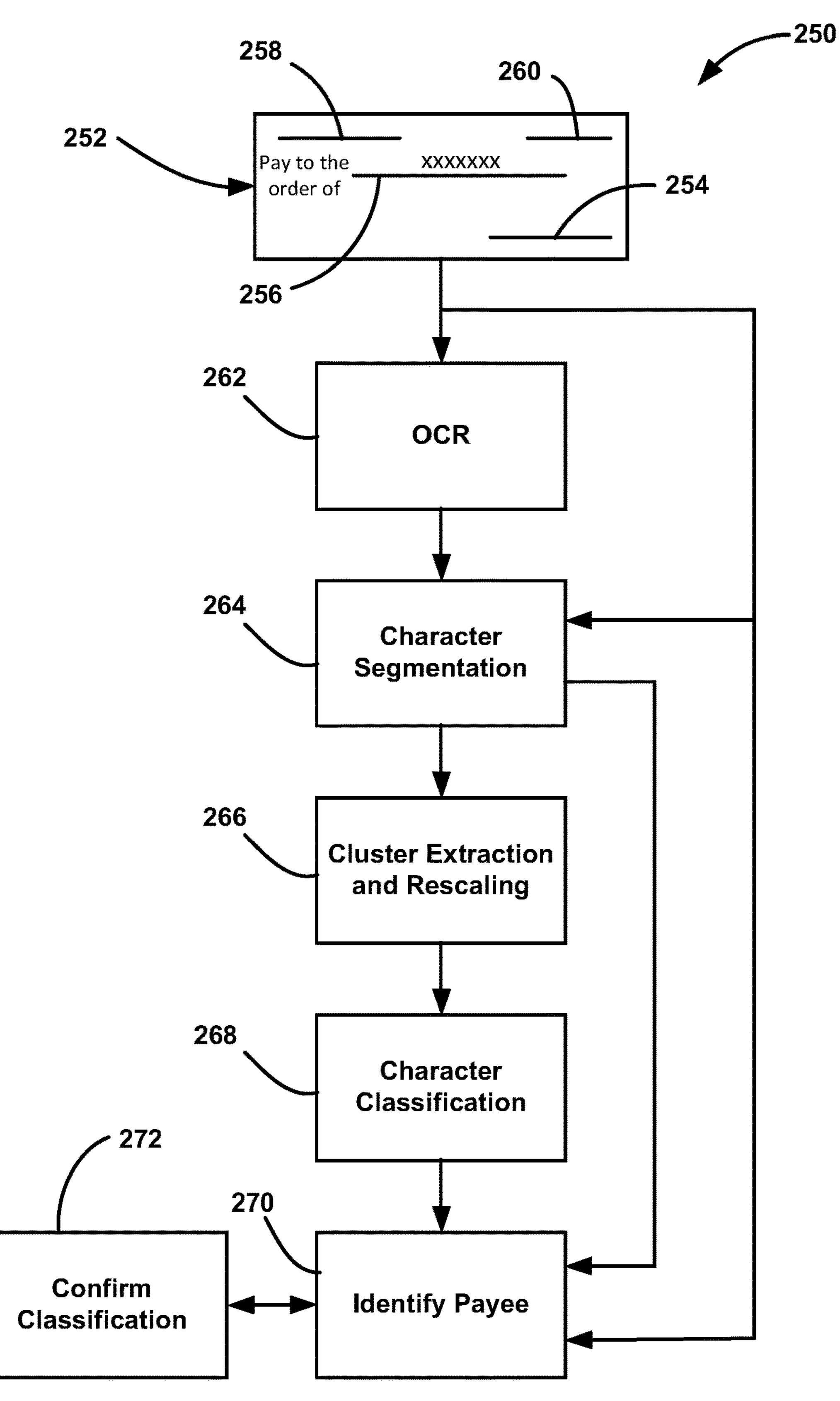
FIG. 11 is an example process for content recognition according to one embodiment.

In another embodiment, the Image Processing Module uses clustering analysis to perform OCR and identify characters. FIG. 11 depicts a flow diagram illustrating a process for identifying handwritten characters in an image. The transfer instrument includes a signature line 256, a line for source identification data 258, and a sequence data line 260 (i.e., a date), among other data fields. The images are subject to OCR processing at step 262 that reads and converts typed and/or printed text on the image 252 into machine-encoded text.

One suitable algorithm for this purpose is TESSERACT available through the PYTHON software suite. Such OCR algorithms read and convert typed text in the image 252 with a high degree of accuracy, but the algorithms may not always reliably read and convert handwritten text on a transfer instrument. An example of handwritten text is shown as the transfer instruction "pay to the order of" positioned next to the source identification data line 256 of the transfer instrument. The OCR algorithm is programmed to identify the expected location of the certain characters in the image or other suitable typed text in the image 252, such as recognizing that sequencing data generally appears to the right of printed text stating "date" or that source identification data generally appears in the upper left portion of an image.

The image 252 can be subjected to a density-based clustering algorithm that provides character segmentation at step 264 that also receives the location of the target identification data line 256 in the image 252. The image data can be converted to black and white with a "1" representing a non-white pixel and a "0" representing a white pixel. The clustering algorithm identifies clusters of non-white pixels in the area of the image 252 identified by the OCR algorithm. Each separately identified cluster may be, for instance, a handwritten character that is part of the source identification data that is handwritten proximate to line 256.

The section of the image 252 being examined is processed as a matrix of pixels where each non-white pixel is considered a data point for the clustering process. One suitable density-based clustering algorithm is Density-Based Spatial Clustering of Applications with Noise ("DBScan"), which is a density-based clustering non-parametric algorithm. Given a set of points in a set space, the DBScan algorithm groups together pixels that are closely packed together (i.e., non-white pixels with many nearby neighbors that are also non-white pixels). The algorithm also marks as outliers points that lie alone in low-density regions whose nearest neighbors are too far away (i.e., a pixel distance above a predetermined threshold). The output of the clustering algorithm is a dataset array that digitally identifies the X and Y coordinates of the pixels in each identified character cluster along with an assigned label for each cluster where the algorithm will assign the same cluster label to data points that are part of the same cluster.

The clustering algorithm is effective for identifying clusters of pixels in the image 252 that are part of the same character. However, some letters, such as, for example, capital "I," may look like two clusters to the algorithm because of the top and bottom bars in the letter. Handwriting heuristics can be employed to add constraints to the clustering algorithm to reduce the probability that more than one cluster dataset array is identified for the same character and/or one cluster dataset includes more than one character. For example, since the source identification data will be written from left to right on the transfer instrument, the clustering algorithm could be designed with a constraint where clusters cannot be stacked top to bottom on the transfer instrument relative to the handwriting direction of the source identification data. In other words, if two clusters are identified in a vertical direction at the same left to right location on the image 252, then that cluster can be considered a single cluster for one character.

Further, a limit to the size or area of the cluster can also be employed as a useful constraint. For instance, if the size of the cluster exceeds a predetermined threshold, then the Image Processing Module denotes the cluster as including more than one character. In that case, the Image Processing Module processes the group of pixels as comprising multiple clusters and characters. In other words, a constraint can be employed that limits the size of each cluster to be less than a predetermined maximum size. Also, a person will typically write in a manner where all of the characters are about the same size or width. If there is a significant inconsistency in the size of the clusters, then the cluster process can be further refined to identify additional clusters. In other words, a constraint can be employed that requires all of the clusters to be within a certain percentage size of each other.

The dataset array from the clustering algorithm is provided to a cluster extraction and rescaling algorithm at step 266 that extracts the individually identified clusters in the dataset array into individual dataset arrays and rescales each individual dataset array into, for example, a twenty-eight by twenty-eight (28×28) pixel cluster image, using extrapolation, which retains the main features of the image 252. The rescaling process also centers the cluster in the cluster image and adds border padding.

Figure 12:
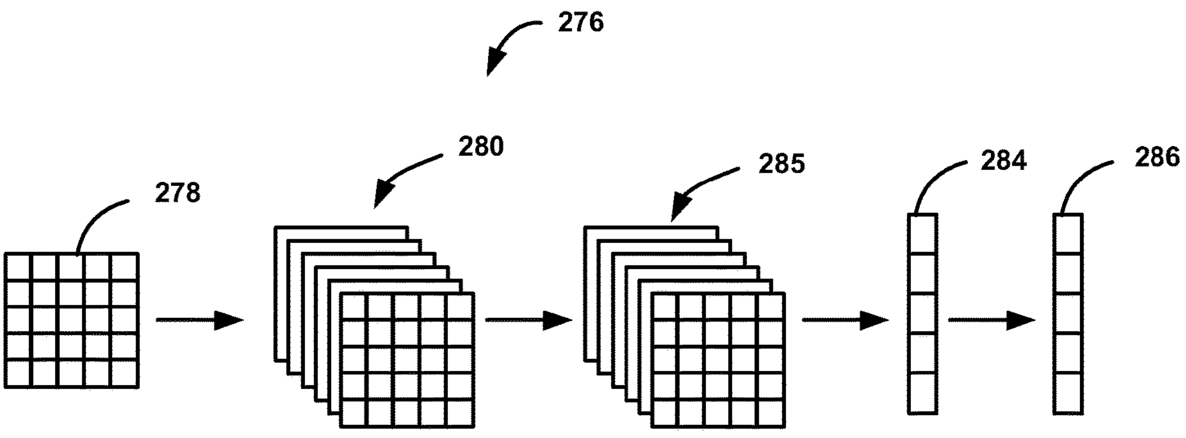
FIG. 12 is an illustration of a neural network that can be used in a character classification model.

Each individual cluster image 274 is provided to a character classification model at box 268 that classifies the likelihood that each cluster image 274 is a particular character. The classification model employs a neural network, such as convolutional neural network 276 shown in FIG. 12. The neural network 276 includes an input layer 278 that receives the cluster image 274, a convolutional layer 280 that classifies the image 274, a pooling layer 282 that reduces the dimensions of feature maps, a fully connected layer 284 that connects the nodes between layers, and an output layer 286 that outputs the classified characters.

The neural network 276 can be trained using a known set of training images, where each training image illustrates a letter or a number that has been assigned one of sixty-two character classes, namely, the upper case letters A-Z, the lower case letters a-z, and the numbers 0-9. The nodes in the neural network 276 are weighted, and those weights are tuned during the training process to allow the neural network 276 to determine what locations in the image 274 include non-white pixels of a particular character. The training process first feeds the neural network 276 character training images of known character values. Then the neural network 276 is fed character training images without identifying the characters. The node weights are adjusted based on correct character identification answers and incorrect character identification answers. The known set of training images could be the EMNIST™ dataset, which is a set of 697,932 handwritten character digits derived from the NIST Special Database 19 and converted to a 28 by 28 pixel image format and dataset structure.

During operation, the neural network 276 determines the likelihood that each image 274 is each of the sixty-two characters, and selects the character with the highest likelihood as the character for that image 274. The classification model outputs a string of characters from left to right along the source identification data line 256, for example, and identifies spaces between certain characters where non-white pixels do not exist as an indication of a separation between words. The classification model can employ any algorithm suitable for the purposes described herein, such as PYTORCH clustering, which is an open source machine learning framework used for applications such as computer vision and natural language processing.

In some embodiments, the content recognition analysis can rely in part on MICR techniques. The MICR techniques generally require a dedicated magnetic reader device that is integrated with, or in signal communication with, the user computing device or provider terminal computing device. Portions of a transfer instrument can include characters printed or generated with magnetic ink or toner that are detected by the magnetic reader device to identify characters.

After performing content recognition and feature detection analyses, the system can perform a segment classification analysis to identify components of the transfer instrument represented by the recognized characters or machine encoded "content elements." In some embodiments, the system first identifies groups of machine encoded content elements (i.e., groups of letters or numbers) and compares the machine encoded content element groups against a database of known segments classifications, such as a payee field or a transfer value field. In other embodiments, natural language processing software can be used to identify groups of characters as representing a segment of the transfer instrument.

Transfer Instrument Segmentation

A segment analysis segments or divides a transfer instrument into logical sections or components. The segmentation can be based on transfer structure, such as lines between text, segment titles, line breaks, indentations, or combinations of such features. In one embodiment, the segments are identified using a categorizer that can be, for example, a probabilistic latent semantic analysis ("PLSA") model trained on a set of segment categories, such as the "pay to the order of field," a "date" field, or a "for"/note field. In one embodiment the categorizer is trained to detect the beginning of each section, for example, by classifying each group of machine encoded content elements or lines as being a segment identification or not (i.e., words or symbols denoting a segment of the transfer instrument).

The segmentation analysis can also divide a transfer instrument or document by splitting the image data into text and non-text sections. A non-text section may be an image or other drawing. Examples of a non-text section could include a provider logo or symbol, a handwritten or digital signature, a holographic image or watermark for security, a personalized mark for a user (e.g., a company logo, collect logo, ornamental drawings), a box to receive a transfer value amount, or a box or line that represents an input field such as an "X" mark to the left of an elongated line designated to receive a signature (e.g., a line that is denoted "X______"). A text section is a collection of human readable machine encoded content elements or characters that can be processed by an OCR system. Examples of a text section could be denoted by the text "pay to the order of" or a series of numerical characters representing routing data or a product identification number.

Two techniques for segmentation include geometric segmentation and logical segmentation. According to geometric segmentation, a transfer instrument is split into text and non-text based on its geometric structure. Geometric segmentation can be used to identify encoded components that use shapes, symbols, and the like, such as standard one-dimensional bar codes or two-dimensional QR codes. A logical segmentation is based on its logical labels such as the "for" field, "pay to the order" of field, "endorsement" field or the like. Logical segmentation is a process of splitting digital text into words, sentences, paragraphs, topics or meaningful sections.

Identifying the structure of a transfer instrument image can rely on an analysis of font sizes or machine encoded content element positioning. In one example embodiment, transfer instrument parameters such as character size and spacing between characters, or words and lines are used to represent document physical layout. As an example, the second, or back side of a transfer instrument can include capital machine encoded content element characters stating "FOR OFFICIAL USE ONLY" or "Endorse Here" that designate segments of the transfer instrument. Software techniques used in physical layout analysis can include: top-down, bottom-up, or hybrid software analysis techniques.

Top-down software techniques start from the whole transfer instrument image and iteratively split it into smaller ranges. Bottom-up software techniques start from transfer instrument image pixels and cluster the pixels into connected components, such as characters that are then clustered into words, lines or zones. A mix of the two approaches is the hybrid approach.

One example bottom-up software technique includes using the K-nearest neighbors algorithm for each connected component of a transfer instrument side and uses distance thresholds to form text lines and blocks. Other examples include separating text components in graphics regions using a Hough transform. Top down approaches include the X-Y-cut algorithm based on recursively cutting a side of a transfer instrument into smaller rectangular areas. A hybrid approach can include identifying gaps between text and images and grouping the gaps into separators after horizontal smearing of black pixels.

In one embodiment, the system relies neural networks trained with annotated data that identify physically divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard machine encoded content element characters. The segment data identifiers may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from a transfer instrument based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

In yet other embodiments, the first step in image processing is to process image data using a Fully Convolutional Neural Network that uses the images of the transfer instrument as inputs and yields as outputs a map of probabilities of attributes predicted for each pixel. That is, each pixel is associated with probabilities that it belongs to a particular category of transfer data or transfer instrument segments that are identified by a provider during training. Training labels are used to generate masks and these mask images are the input data used to train the network. The second step of the content recognition analysis maps the predictions to the desired output of transfer instrument segments.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals.

In addition to segmenting the transfer instrument into logical sections or components, the system can extract transfer data by grouping machine encoded content elements into tokens, such words or groups of words that comprise the transfer data. To illustrate with a simplified example, the system processes an electronic transfer instrument image using a content recognition analysis to identify the individual machine encoded content elements, such as a series of characters "P," "a," "t," 'r," "i," "c," and "k." The machine encoded content elements are grouped into tokens, such as words, and groups of tokens are identified as one or more clusters. Thus, the string of machine encoded content elements above is recognized as a token "Patrick." The token Patrick is identified as a name with semantic and heuristic processing techniques and grouped with additional tokens to identify a full cluster, such as the individual name "Patrick Smith" or the business name "Patrick Family Restaurants."

As another example, a string of machine encoded content elements and tokens "Deposit to Saving 1234" is identified as a cluster representing transfer instructions placed on a transfer instrument that denotes parameters for how an electronic transfer is conducted. The identification of machine encoded content elements, tokens, and clusters of data is facilitated by a segment analysis that recognizes a structure of a transfer instruments where particular regions of a transfer instrument image represent specific elements of data, such as a written resource value data indicating the volume of resources subject to an electronic transfer.

As a further non-limiting example, the system can process image data representing a transfer instrument using a content recognition analysis to identify the string of machine encoded content elements "pay to the order of" adjacent to a string of handwritten, scripted machine encoded content elements "Patrick Smith." The system then performs a segment analysis to generate segmentation data identifying the "payee line" of a transfer instrument. The segment map index data identifies the payee line as being adjacent to the text "pay to the order of." The system identifies the handwritten machine encoded content elements "Patrick Smith" as being a payee user identification component of the transfer data. The user identification can be stored for later analysis, such as validating the correct user identification for enhanced security and accuracy.

Grouping machine encoded content elements into tokens or words can be performed using natural language processing technology alone or in combination with segmentation software processing techniques. In one embodiment, grouping machine encoded content elements can be performed by an extraction software module that is trained to label tokens and clusters according to classifications of transfer data, such as a transfer source identifier, a transfer target identification, a provider identifier, among other categories. The extraction software module can be implemented with a rule-based software technique, with probability models implemented by neural networks, such as Conditional Random Field system, or with combinations of rule-based techniques and neural networks.

Generating tokens can also be performed by detecting white spaces between machine encoded content elements. Morpho-syntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and token extraction can generate map index data that identifies the locations of segments and tokens with image data representing a transfer instrument. For example, each machine encoded content element (including spaces between tokens) can be indexed in a sequence using pixel coordinates. Segments and tokens can be indexed according to a first coordinate index and an index length. For example, transfer data for a target identification can have a location index coordinate and a length that maps the target identification data to a matrices of pixels within an image.

Natural Language Processing Technology

The systems and methods can process electronic transfer instruments using artificial intelligence and natural language processing technology to identify text data within the transfer instrument and to classify the text data. The system processes a transfer instrument by determining the overall structure of the transfer instrument according to various segments. Then within each segment, the system recognizes individual machine encoded content elements, such as characters, numbers, and symbols within the transfer instrument. The system next identifies what the machine encoded content elements represent by classifying various segments, or components of the transfer instrument.

Human-readable alphanumeric content data, or text data, representing linguistic expressions can be processed using natural language processing technology that is implemented by one or more artificial intelligence software applications and systems. The artificial intelligence software and systems are in turn implemented using neural networks. Natural language processing technology analyzes one or more files that include alphanumeric text data composed of individual communication elements, such as text characters, words, symbols, or numbers. Natural language processing software techniques can be implemented with supervised or unsupervised learning techniques. Unsupervised learning techniques identify and characterize hidden structures of unlabeled text data. Supervised techniques operate on labeled text data and include instructions informing the system which outputs are related to specific input values.

Supervised software processing rely on iterative training techniques and training data to configure neural networks with an understanding of individual words, phrases, subjects, sentiments, and parts of speech. As an example, training data is utilized to train a neural network to recognize that phrases like "Pay to the order of," "for deposit only," or "endorse here" all relate to the same general subject matter when the words are observed in proximity to one another at a significant frequency of occurrence.

Supervised learning software systems are trained using text data that is well-labeled or "tagged." During training, the supervised software systems learn the best mapping function between a known data input and expected known output (i.e., labeled or tagged text data). Supervised natural language processing software then uses the best approximation mapping learned during training to analyze previously unseen input data to accurately predict the corresponding output.

Supervised learning software systems require iterative optimization cycles to adjust the input-output mapping until the networks converge to an expected and well-accepted level of performance, such as an acceptable threshold error rate between a calculated probability and a desired threshold probability. The software systems are supervised because the way of learning from training data mimics the same process of a teacher supervising the end-to-end learning process. Supervised learning software systems are typically capable of achieving excellent levels of performance when enough labeled data is available.

Supervised learning software systems utilize neural network technology that includes, without limitation, Latent Semantic Analysis ("LSA"), Probabilistic Latent Semantic Analysis ("PLSA"), Latent Dirichlet Allocation ("LDA"), or Bidirectional Encoder Representations from Transformers ("BERT"). Latent Semantic Analysis software processing techniques process a corpus of text data files to ascertain statistical co-occurrences of words that appear together which then yields insights into the subjects of those words and documents.

Unsupervised learning software systems can be designed with integrated intelligence and automation to automatically discover information, structure, and patterns from text data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM"). Clustering software techniques can automatically group semantically similar machine encoded content elements together to accelerate the derivation and verification of an underlying common segment—i.e., ascertaining or deriving a new segment or element of transfer data, rather than classifying transfer data into an adjacent segment. This permits the system, for example, to distinguish between the "payee" segment of transfer data being above or adjacent to the "transfer value data" or amount of resources being transferred.

The software utilized to implement the present systems and methods can utilize one or more supervised or unsupervised software processing techniques to perform a segment classification analysis to generate segment data that characterizes the segments of transfer data and other content within a transfer instrument. Suitable software processing techniques can include, without limitation, Latent Semantic Analysis, Probabilistic Latent Semantic Analysis, Latent Dirichlet Allocation. Latent Semantic Analysis software processing techniques generally process a corpus of text files, or documents, to ascertain statistical co-occurrences of words that appear together which then gives insights into the subjects of those words and documents. The system software services can utilize software processing techniques that include Non-Matrix Factorization, Correlated Topic Model ("CTM"), and KMeans or other types of clustering.

As part of a natural language processing analysis, the text representing the transfer data is vectorized to map the alphanumeric text into a vector form. One approach to vectorizing text data includes applying "bag-of-words" modeling. The bag-of-words approach counts the number of times a particular word appears in text data to convert the words into a numerical value. The bag-of-words model can include parameters, such as setting a threshold on the number of times a word must appear to be included in the vectors.

Techniques to encode the context of words, or machine encoded content elements, to determine how often communication elements appear together. Determining the adjacent pairing of machine encoded content elements can be achieved by creating a co-occurrence matrix with the value of each member of the matrix counting how often one machine encoded content element coincides with another, either just before or just after it. That is, the words or content elements form the row and column labels of a matrix, and a numeric value appears in matrix elements that correspond to a row and column label for content elements that appear adjacent in the text data.

The text or symbols representing the content data is processed using a segment classification analysis to determine segment data that represents identifiers of segments of transfer data within the transfer instruments. The segment identifiers correspond to identifiable, discrete components of the transfer instrument, such as a routing data, a product identification, an augmentation, transfer value data, sequencing data, or user contact data, among other segments.

In one embodiment, the segment classification analysis is performed on the text data using a Latent Drichlet Allocation analysis to identify segment data that includes one or more segment identifiers (e.g., components of the electronic transfer instrument). Performing the LDA analysis on the transfer instrument content element data may include transforming the content elements into an array of text data representing key words or phrases that represent a segment (e.g., a bag-of-words array) and determining the one or more segment identifiers through analysis of the array. Each cell in the array can represent the probability that given text data relates to a given segment. A segment is then represented by a specified number of words or phrases having the highest probabilities (i.e., the words with the five highest probabilities), or the segment is represented by text data having probabilities above a predetermined subject probability threshold.

Clustering software processing techniques include K-means clustering, which is an unsupervised processing technique that does not utilized labeled text data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or content elements associated with each cluster, which can be referred to as segment data vectors. Segments may each include one or more segment vectors where each segment vector includes one or more identified content elements (i.e., keywords, phrases, symbols, etc.) within the transfer instrument text data as well as a frequency of the one or more content elements within the transfer instrument text data.

Named Entity Recognition ("NER") software processing techniques can be used to identify various content sources within the text data. NER techniques are utilized to classify a given word into a category, such as a person, product, organization, or location. Using NER techniques to process the text data allow the system to identify particular words and text as a noun and as representing a transfer source provider or user (i.e., a payer) or transfer target provider or user (e.g., a payee).

Neural networks are trained using training set text data that comprise sample tokens, phrases, sentences, paragraphs, or documents for which desired subjects, content sources, interrogatories, or sentiment values are known. A labeling analysis is performed on the training set text data to annotate the data with known segment labels, thereby generating annotated training set text data. For example, a person can utilize a labeling software application to review training set text data to identify and tag or "annotate" various segments within a transfer instrument.

The training set text data is then fed to a natural language software service neural networks to identify segments, transfer sources, and various other elements of transfer data and the corresponding probabilities. For example, the analysis might identify that particular text represents an augmentation, or "endorsement," with a 35% probability. If the annotations indicate the text is, in fact, an augmentation, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set text data to continue to increase the accuracy of the neural network.

Interfacing with a Provider System

The present systems and methods allow end users to initiate, authorize, validate, and provide processing instructions for electronic transfers by creating an electronic transfer instrument. The systems and methods further allow users to generate, view, and apply to an electronic transfer instrument, electronic augmentations that provide information concerning the transfer, such as a user identification for the user receiving the transfer, a product identification, and instructions for processing the transfer.

Users generate transfer instruments, initiate electronic transfers, and apply electronic augmentations to transfer instruments using one or more software applications that are integrated with a computing device that is being utilized by a user, such as a user personal or mobile computing device or a provider terminal accessed by a user. The software can be created and maintained by the provider, such as a provider "mobile app," or created by a third-party source, such as an Internet browser software application that is used to interface with a provider system. The software employed by users to interface with the provider system will generally be referred to as a Provider Interface Application.

The Provider Interface Application can be integrated with, or installed on, a user computing device, a provider terminal computing device, or another type of computing device utilized by the user. The Provider Interface Application can itself be comprised of one or more software services, software modules, or application programming interfaces ("APIs") that interface with the other hardware and software components integrated with a computing device. In some instances, the Provider Interface Application may "call," or interface with, APIs or software services integrated with the computing device operating system software.

In the present system, the Provider Interface Application can include or can interface with a Camera API that converts inputs entered by a user into software messages, commands, and data that is formatted for processing by the camera device in performing image capturing functions. A user may select a capture input function or a "flash" input function on the user computing device that the Camera API converts into a software command that causes the camera to take a picture and emit a flash of light to enhance the resulting image. As further non-limiting examples, the Provider Interface Application can include an Interface Service Module that generates graphical user interfaces ("GUIs") displayed to users or an Image Processing Module that performs functions that analyze, edit, or manipulate image data from the camera.

The user computing devices launch and run integrated software applications, such as a Provider Interface Application, to securely connect to the provider system to create transfer instruments as performed by transfer sources, execute electronic transfers as performed by transfer targets), or generate electronic augmentations used to process a transfer also performed by transfer targets. Once a secure connection is established, end users navigate a series of GUIs to interact with the provider system and to create a transfer instrument or to digitize a transfer instrument that has been received. End users digitize a transfer instrument by, for instance, capturing a photograph of the transfer instrument, using a bar code reader to scan an encoded component/segment, applying a decryption key to decrypt an encoded component, or using other techniques to decode an encoded component. An electronic augmentation can be applied to the digitized transfer instrument and presented to the end user for verification before initiating the transfer. The user computing device interacts with components of a provider system, such as various network computing devices (i.e., a server).

In particular, user computing devices communicate with a provider system by sending data to and from external, public-facing component of the provider computing system, such as an external server that can be a web server or other external communication computing device. The external server in turn interacts with an internal interface computing device also associated with a provider computing system. Among other functions, the internal interface computing device is responsible for processing sensitive data gathered from the "back end" components of a provider computer system that may be protected by a firewall software application or system. The internal interface computing devices thus prevent third-party computing devices and applications and from having direct access to the sensitive data stored to a provider system.

The provider external server processes communication data requests sent to, and received from, the user computing device or from third party applications and computing devices. The external server routes communications requesting sensitive data through the internal server for secure communication. The internal server in turn communicates with other back end components of the provider system, such as databases and servers that store sensitive user data (e.g., account numbers, addresses, resource availability data or account balances, etc.).

In accessing the provider system, the user computing device transmits a user interface transmit command to the external server that can include: (i) an Internet Protocol ("IP") address for the user computing device; (ii) system configuration data; and (iii) navigation data (e.g., data corresponding to browsing history, or websites and Internet Protocol addresses accessed by the user computing device). In response to the user interface transmit command, the external server returns interface display data and a digital cookie that is stored to the user computing device and used to track functions and activities performed by the user computing device.

In some embodiments, the system configuration data and navigation data is utilized by the external server to generate the interface display data. For instance, the system configuration data might indicate that the user computing device is utilizing a particular Internet browser or mobile software application to communicate with the provider system. The external server then generates interface display data that includes instructions compatible with, and readable by, the particular Internet browser or mobile software application. As another example, if the navigation data indicate the user computing device previously visited a provider webpage, the interface display data can include instructions for displaying a customized message on the user computing device, such as "Welcome back Patrick!"

After receiving interface display data, the user computing device processes the display data and renders GUI screens presented to users, such as a provider website or a GUI within a provider mobile software application. In some embodiments, the system configuration data may be sent to the provider system in a separate message subsequent to the user interface transmit command message.

The interface display data can include one or more of the following: (i) webpage data used by the user computing device to render a webpage in an Internet browser software application; (ii) mobile app display data used by the user computing device to render GUI screens within a mobile software application; (iii) user transfer activity data that is used by the user computing device to render a webpage GUI that provides users access to view user resource availability data (e.g., account types and balances) and to view, select, and establish transfer instruction parameters. Categories of interface display data can include graphical elements, digital images, text, numbers, colors, fonts, or layout data representing the orientation and arrangement graphical elements and alphanumeric data on a user interface screen.

Upon authenticating to the provider system, user computing devices can receive interface display data for rendering a Homepage GUI on the user computing device. The Homepage GUI displays information relating to user accounts and products, including, without limitation: (i) a provider product identification (e.g., an account name, number, or nickname such as "Patrick's Checking" or "Boat Loan"); or (ii) resource availability data for each user account or product (e.g., balances for various product types or account types associated with or held by a user) . . . . The Homepage can further include navigation input functions that allow users to navigate and display additional Resource Management GUIs, such as an Account Interface that displays transfer activity data for each account or product held by a user and a User Profile GUI where users can access and edit end user data stored to an End User Database.

The user transfer activity data is stored to a Transfer Activity Database on the provider system as a series of individual transfer database records. The transfer database records correspond to individual transactions performed by a user over time where each transaction involves the transfer of resources. The Transfer Activity Database can include data relating to one or more accounts held by a user, such as checking or credit card accounts.

The Transfer Activity Database is implemented as a relational database that stores the resource transfer activity data in manner that allows various types of data elements to be associated with, or correspond to, one another when stored to a database record. The transfer database records store information that includes, without limitation: (i) the unique user identifier that designates a provider user that owns or has custody and control over a particular account or product; (ii) an account identification; (iii) resource availability data for each user account or product (e.g., balances for various product types or account types associated with, or held by, a user); (iv) utilization value data representing the value of resources utilized during transaction; (v) transfer event sequencing data (e.g., a date and time that a given transaction occurred or that otherwise indicates when one transaction occurred relative to another); (vi) a transaction identifier that identifies or characterizes a transaction during which resources were utilized; (vii) a terminal source identification, which can be a name or identification number (e.g., an employment identification number) of another party to a payment transaction, such as a retailer that accepts payment from a user, or an individual or employer that makes a payment to a user; (viii) transaction location data that indicates where a given transaction occurred (e.g., a zip code, city, or state); (ix) transfer classification data, such as an alphanumeric code, word, or phrase that categorizes a resource transfer or transaction and that can relate to the purpose for which resources are transferred (e.g., transportation expense, housing, groceries, or a paycheck from an employer, or an alphanumeric code representing such a category, such as a Merchant Category Code); (x) average resource availability data that indicates the average value of products or account balances maintained by the user over a given time period (e.g., an average monthly balance for an account held by the user); and (xi) average resource transfer volume data indicating the average number of transactions a user conducts using a given product or account over a given time period (e.g., the number of transfer instructions per month for a given account).

The user computing device may also transmit system configuration data to the provider system that is used to verify a user identify or authenticate the user computing device. System configuration data can include, without limitation: (i) a unique identifier for the user computing device (e.g., a media access control ("MAC") address hardcoded into a communication subsystem of the user computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device can capture geolocation data that is used to authenticate the device, ensure security of a transfer instrument, or create an electronic augmentation. The geolocation data can be captured from a global positioning system integrated with the user computing device. In other embodiments, the provider system can determine location data for the user computing device based on the user device IP address. The provider system includes a software application that transmits the user device IP address to an Identity & Location API that utilizes the device IP address to determine an approximate geographic location of the user computing device. The Identity & Location API passes the user device IP address to a database or a third-party software service that returns geographic location data for the user device IP address, such as a city, county, or state. The Identity & Location API stores the geographic data to a database record on the provider.

The user computing device authenticates to the provider system if the user has an existing electronic account with the provider. The user computing device navigates to a login GUI and enters authentication data, such as a user name or unique user identification, a password, a personal identification number ("PIN"), an alphanumeric code, or biometric information (e.g., a fingerprint or facial recognition). The authentication data, also known as user security data, can correspond to data and information that is known by the provider to be in possession of the user. The user then selects a submit function on the login GUI to transmit an authentication request message to the provider including the possession element data.

In some embodiments, the authentication data and/or authentication request message can further include elements of the system configuration data that are used to authenticate the user, such as a user computing device identification or a user device IP address. For example, upon launching the Provider Interface Application, the user enters a fingerprint or a PIN code. The user computing device automatically gathers system configuration information that is sent to the provider system along with the authentication data within an authentication request message.

The provider system passes the authentication request message to an identity management service, which performs a verification analysis to verify the identity of the user or user computing device. The verification analysis compares the received authentication data to stored user authentication data to determine whether the received and stored authentication data sets match. The identity management service, thus, determines whether a correct user name, password, PIN, biometric data, device identification, or other authentication data is received.

In some embodiments, the identity management service receives authentication data that includes biometric data or a PIN code with or without system configuration data. The identity management service utilizes the received authentication data to determine the user identification based on a query to the provider database. The user thus enters non-identifying information such as a PIN that is used along with or without system configuration data to identify the user.

Once the verification analysis verifies the end user and/or user computing device, the identity management service returns an authentication notification message to a provider external server. The authentication notification message includes a verification flag indicating whether the verification passed or failed and a reason for a failed authentication, such as an unrecognized user name, password, PIN, biometric data, or user computing device identification.

The user authentication request message can also include system configuration data, and the provider's back end servers can use system configuration data and user account data to perform the authentication process. As one example, the identity management service might store a user computing device MAC address to a database record as part of the user account data. Upon receipt of an user authentication request message that includes a MAC address, the identity management service compares the received MAC address data against stored MAC address data that is associated with the user account data. In this manner, the user computing device can also be authenticated to the provider system. If the received and stored MAC addresses do not match, the identity management service returns an authentication decision message to the external server indicating the authentication failed because the user computing device could not be authenticated. The external server can then prompt the user to verifying whether the consumer is using a new device to login to the provider system, and if so, begin the process of registering a new device to the provider's system.

The system verification analysis can also utilize multifactor authentication techniques ("MFA") to authenticate the user identity or a user computing device. As one example, if the user authentication data is successfully verified, a MFA software process running on the provider system can initiate a telephone call or send a short message service ("SMS") text message to a phone number stored as part of the verification analysis. Upon receiving a call, the user selects an input function on the telephone to transmit response data to the MFA software process that confirms receipt of the call, thereby further authenticating the user's identity. The function can be the user's selection of any key on the telephone or a pre-determined sequence of keys, such as a passcode. Alternatively, on receiving a SMS text message that includes a numeric or alphanumeric code, the user enters the code into a user interface such as the Provider Interface Application or website. The code is transmitted to the MFA software process to verify receipt by the user.

Those of skill in the art will appreciate that other forms of MFA are possible, such as sending a text message containing a passcode to the user's cellular phone that must be entered into a user interface screen or utilizing a separate software application running on the user computing device to generate a key or passcode that is verified by the provider system.

The provider system stores a variety of end user data that characterizes the end user and the end user relationship to the provider. The end user data is utilized in generating transfer instruments, digitizing transfer instruments, authenticating end user identification, or generating electronic augmentations, among other functions.

The end user data is stored to an End User Database as user profile database records and includes, without limitation: (i) a user identification; (ii) user contact data, such as a mailing address or a geographic region where the user resides (e.g., a zip code, city, state); (iii) user source data, such as user telephone number data, user device IP address, an email address, or a social media account name; (iv) co-user or co-authorized user identification(s) that identify other users who are authorized to use a given provider product; (v) one or more account identifications or provider product identifiers that indicate the accounts or products currently held by a user; (vi) location data, such as a geographic position as determined from a Global Positioning System ("GPS") integrated with the user computing device or from a user computing device IP address; (vii) user activity data that is representative of various functions or selections utilized by a user; (viii) system configuration data; and (ix) navigation data.

The user activity data can include a wide variety of information that tracks activities of a user when utilizing a provider system. Examples of user activity data include, but are not limited to: (i) a log of user attempts to access a provider system, including the date, time, device used, and device IP address; (ii) navigation data, including the GUIs accessed by a user while logged into the provider system; (iii) settings edited by a user or selections made by a user (e.g., a selection to view or decline to view a notification or message); (iv) a log of written communications between a user and a provider, including the communication content data, a date, time, an identifier for the device used, and a device IP address; (v) a log of support requests or telephone calls between a user and a provider; (vi) resource transfers logs; or (vii) other functions and activities performed by a user that are capable of being recorded electronically.

Establishing Electronic Augmentations

Prior to initiating an electronic transfer, users establish electronic augmentations that can be applied to digitized transfer instruments. User computing devices establish a secure communication session with the provider computing system and navigate a series of GUIs to establish one or more distinct electronic augmentations and permissions for each product. The electronic augmentations and permissions define, for example: (i) the identity of users that are authorized to initiate or approve a resource transfer for each product; (ii) transfer instructions for processing a resource transfer; and (iii) the particular transfer instructions that each user is permitted to authorize.

The transfer instruction data defines particular actions taken when processing an electronic transfer of resources. Transfer instruction data can include, without limitation, instructions specifying: (i) a product identification for an account that will receive resources being electronically transferred; (ii) restrictions on the transfer destination, such as a "for deposit only" instruction that requires the entire amount or value of the resources being electronically transferred to be deposited into a single account associated with a specified product identification; (iii) that the resources being electronically transferred should be directed to a third party, such as a "pay to the order of" instruction; or (iv) that the transfer is directed to a particular beneficiary or for a dedicated purpose, such as a "for the benefit of" instruction whereby the electronic transfer is directed to a specified third party account and to be used for a named third party or purpose.

The utility of being able to establish multiple distinct, electronic augmentations that are applied in a consistent manner is illustrated with the following simplified, non-limiting example. In a commercial context, a business might have a brand name or a "doing-business-as" ("d/b/a") name that is different from the name of the juristic legal entity under which the business operates, such as a restaurant called "Patrick's Patties" that operates under a juristic business entity named "Patrick Family Restaurants, LLC." The business might have multiple accounts with a provider that are each titled in the juristic entity name. Further, each account can have different authorized users, such as a first "owner" account having the business owner as the only authorized user and a second "operating" account having two managerial employees as authorized users.

In the above example, third parties might regularly initiate transfers through prepared transfer instruments that specify "Patrick's Patties" (i.e., the "d/b/a" name) as the transfer recipient even though the accounts are titled under the name "Patrick Family Restaurants, LLC" (i.e., the juristic entity name). When processing a transfer instrument, a provider is often not able to determine the proper recipient if the recipient named in the transfer instrument does not match how an account is titled. Thus, to ensure transfers are properly routed, standardized electronic augmentations can be established that specify the transfer recipient as "Patrick Family Restaurant, LLC d/b/a Patrick's Patties"—i.e., a marking that links the recipient named in the transfer instrument to the name in which the provider products or accounts are titled. The standardized electronic augmentations are automatically applied to the transfer instruments thereby reducing or eliminating potential errors when identifying the transfer recipient.

To establish one or more electronic augmentations, users navigate to a Augmentation Settings GUI that receives augmentation settings data from users that is used to create electronic augmentations. Augmentation settings data can include, without limitation: (i) digital signature data, which can be an image of a handwritten marking or a series of alphanumeric characters or symbols used to identify an user and that serve as a user authorization input; (ii) a target product identification (e.g., an account number or name to receive the electronic transfer); (iii) user contact data, such as a mailing address, a geographic region designating the user's principal location (e.g., a zip code, city, state), an email address, or telephone number; (iv) authorized user identification data, such as a name, user name, or identification number that identifies users authorized to apply electronic augmentations; (v) role data indicating the actions an user is permitted to take, such as applying certain electronic augmentations that contain transfer instructions; (vi) transfer instruction data that designates how an electronic transfer should be processed; and (vii) marking instruction data that can establish restrictions and rules for how electronic augmentations are applied to a transfer instrument, such as applying a particular electronic augmentation to transfer instruments originating from a particular transfer source identification.

The augmentation settings data is used to generate electronic augmentation data that is used to generate the electronic augmentation. The electronic augmentation data is converted to human-readable text that includes letters and numbers or symbols, such as names, addresses, or product identification numbers. The augmentation data is converted to a human-readable alphanumeric text or symbols by, for instance, mapping alphanumeric characters in the augmentation marking data to matrices of pixels that represent an image of the character to be rendered on a display device. That is, the augmentation data might include a data representing a "1" or the letter "A," and the system accesses a set of standard character pixel matrices to output a human-readable character in a particular font or size.

In some embodiments, the augmentation data can be determined in whole or in part from data input by the user at or near the time the transfer instrument is digitized. To illustrate, a user can select an "initiate transfer" input function on a GUI displayed on a user computing device. Selecting the initiate transfer function can display a GUI such as the interface shown in FIG. 8 that prompts the user to enter transfer data or augmentation data, such as a product identifier or transfer instruction data. In this manner, a user can determine at the time of the electronic transfer which account will receive the transfer, and the augmentation marking data can be generated accordingly to include the proper product identification data and transfer instruction data.

The augmentation data can be applied to an electronic transfer instrument by, for example, creating metadata that is appended to the file(s) representing the transfer instruments. Or alternatively, the augmentation marking data can be used to create a separate metadata file that is associated with the file(s) representing the electronic transfer instruments.

The electronic augmentation can be rendered as being overlaid on the transfer instrument image either prior to capturing an image or after the image is captured. That is, while a user is positioning the camera relative to the transfer instrument in preparation for capturing a still image, the user or terminal computing device display can render a continuous stream of dynamic image data showing the transfer instrument (i.e., a video). The continuous image stream can be augmented with the electronic augmentation along with the visual guide shown in FIG. 9. In this manner, the user can review the accuracy of the augmentation marking data while at the same time position the electronic augmentation on the transfer instrument in a manner that does not interfere with content on the transfer instrument.

After the user selects an image capture input function to generate a still image, the computing device can display the still image of the transfer instrument with the electronic augmentation overlaid on the transfer instrument and appearing to be part of, or printed on, the transfer instrument. Thus, the user has another opportunity to review the accuracy and position of the electronic augmentation prior to authorizing the electronic transfer.

Initiating Electronic Transfers and Capturing Image Data

Figure 13:
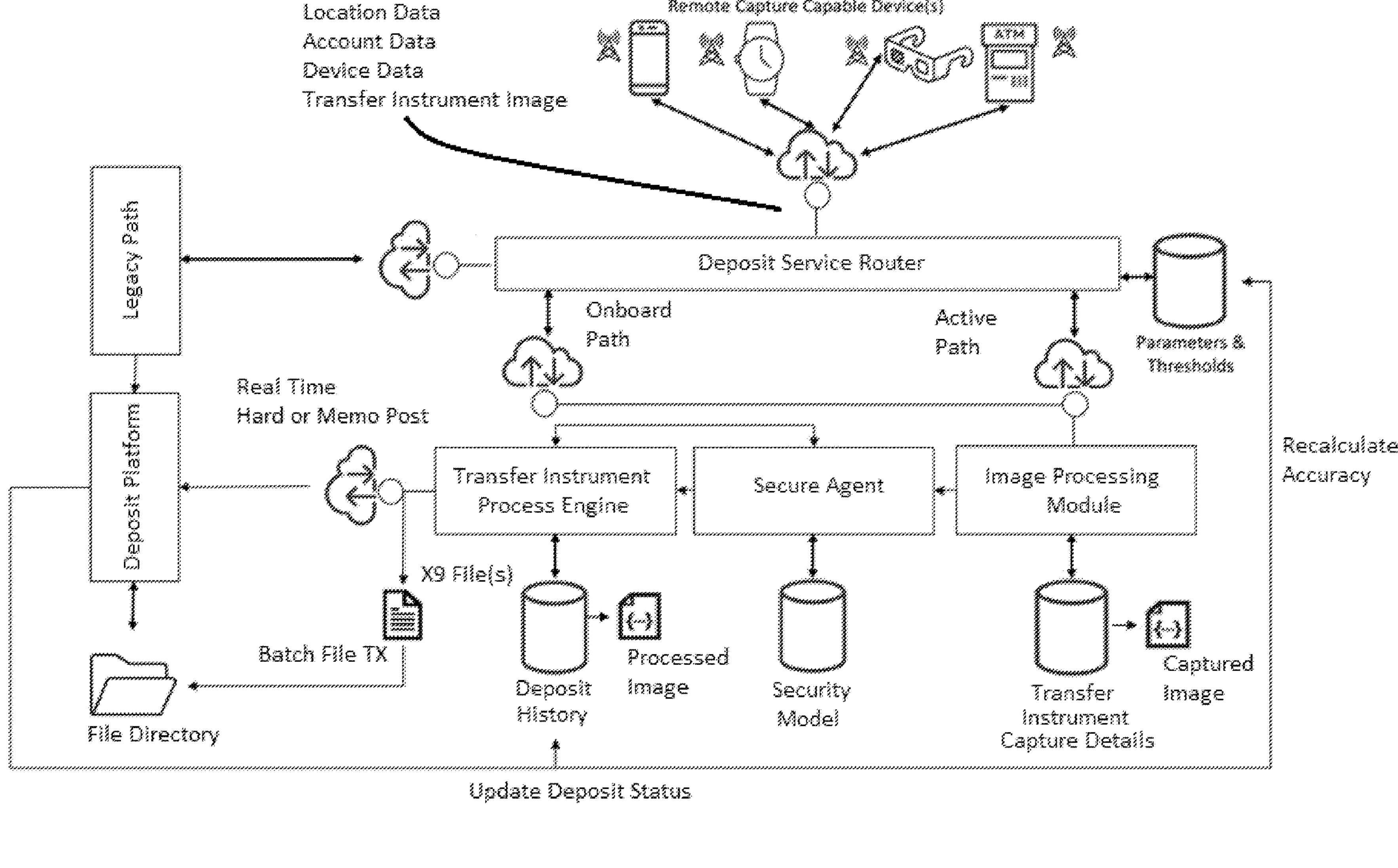
FIG. 13 is an example system diagram for security detection and verification.

An example process for initiating and authorizing an electronic transfer is shown in FIG. 2 and an example system for securing the transfer instrument is shown in FIG. 13. The user may receive one or more hardcopy or digital transfer instruments from third party transfer sources. The transfer instruments include transfer data that is processed by the provider to execute a transfer of resources from the third party transfer source to the user. The transfer instrument is reviewed, processed, and authorized by a user prior to initiating the transfer. Processing the transfer instrument includes performing operations that validate the transfer data and apply electronic augmentations that serve as a transfer authorization and that includes transfer instruction data used by the provider to implement the transfer.

The transfer data included within the transfer instrument can include, without limitation: (i) source identification data that names or identifies the source of the resource transfer; (ii) sequencing data, such as a date that the transfer instrument was created or data that otherwise indicates an order or sequence in which the transfer instrument was created relative to other transfers and transfer instruments; (iii) target identification data that names or identifies the user receiving the transfer; (iv) transfer value data that represents the amount or volume of resources being transferred; (v) a source signature data, such as a handwritten marking or a series of alphanumeric characters or symbols used to identify the third party transfer source and that serves as a designation that the transfer is authorized by the third party; (vi) source contact data, such as a mailing address, phone number, or email address of the third party source; (vii) source provider identification data that names or identifies a provider that renders services to the third party transfer source in implementing the transfer; (viii) a transfer instrument identification, which can be an alphanumeric string of characters that is unique to the transfer instrument (e.g., a document identification number); (ix) routing data used to route the transfer from the transfer source provider to the recipient user provider; (x) a source product identification (e.g., an account number for the transfer source); and (xi) notation data that can be alphanumeric textual content generated by the third party transfer source, such as a short narrative describing the purpose of the transfer (shown as the "Memo" line in FIG. 10).

The user initiates and authorize a transfer by first launching a software application, such as a Provider Interface Application, that establishes a secure connection to the provider system. The user computing device generates one or more GUIs, such as the GUI shown in FIG. 8 that include input functions selectable by users, such as pull down menus, radio buttons, or text boxes. Users select an initiate mobile transfer function to begin the process of executing a transfer and creating an electronic transfer instrument.

Users enter transfer data or augmentation data prior to digitizing the transfer instrument. For example, the user computing device can display a GUI with one or more input fields, such as: (i) a user identification input field; (ii) a target product identification input field (i.e., an account to receive the transfer); (iii) a transfer value data input field; (iv) an transfer instruction data input field; and (v) other elements of transfer data that can be entered manually and used for, among other purposes, verifying transfer data that is automatically detected on the electronic transfer instrument.

At least one of the GUIs includes an image capture input function, such as the Image Capture button shown in FIG. 9. Selecting the image capture input function causes the user computing device to activate a digital camera or "image source" to capture an image that is used to digitize the transfer instrument. The transfer instrument can be digitized with the user computing device by, for example, capturing one or more images or capturing a video of the transfer instrument using the digital camera.

In other embodiments, image sources other than cameras can be used, such as electronic document scanners that generate transfer instrument content data as an image file, PDF file, or other digitized format. Each transfer instrument content file, or source image data, can depict a different portion or side of the transfer instrument (e.g., front and back) to capture all available transfer data for conversion to a digital format. In other embodiments, the transfer instrument is read with a code reader device that emits light that is reflected from the encoded component of the transfer instrument where the pattern of reflected light is used to decode the transfer data. The camera, other image source device, or code reader device can be integrated with the user computing device or connected as a separate device, such as a scanner or a portable digital camera that is in signal communication with the user computing device through a USB or other suitable cable or through a wireless connection, such Bluetooth® or NFC.

The image source device generates source image data that is processed by one or more software applications integrated with the user computing device, such as an Image Processing Module. The source image data is processed to implement functions that include, without limitation: (i) performing a content recognition analysis that determines the transfer data included within the transfer instrument through techniques such as optical character recognition ("OCR"); (ii) performing a feature recognition analysis to determine characteristics of the transfer instrument, such as physical dimensions or boundary edge locations; (iii) a segment analysis that determines various components of the transfer instrument image and identifies elements of transfer data within the transfer instrument; (iv) rendering electronic augmentations as an overlays on displayed images of the transfer instrument; (v) performing an electronic augmentations integration operation that associates, correlates, integrates, or appends the augmentation data with or to the transfer instrument content data for later processing by the provider; and (vi) performing image enhancement operations to improve accuracy of human or machine reading of the transfer instrument, such as sharpening the image, de-skewing the image, de-speckling the image, reorienting the image, de-warping the image, converting the image to greyscale or black-and-white colorization (i.e., binarization), or adjusting the color, among other functions.

The transfer instrument content data, or source image data, can be static image data, such as when the camera captures a photographic image of the transfer instrument at an instant in time. The source image data can also be dynamic image data where the camera generates a continuous feed of image data (i.e., sequential static image frames) rendered on a display device that is integrated with the user computing device (i.e., a video stream depicting the transfer instrument displayed on a touch screen). Providing a continuous stream of dynamic image data allows the user to align the camera with the transfer instrument before capturing an image. Better alignment of the camera and the transfer instrument helps ensure that the augmentation content data represents a more accurate and complete depiction of the transfer instrument, including any transfer data within the transfer instrument.

When capturing an image, the user computing device display can be configured to render a visual guide, such as a box, outline, or partial corners of a rectangle shown in FIG. 9. Users align the visual guide with the transfer instrument shown on the computing device display, such as placing the transfer instrument within the visual guide, before selecting an image capture function to generate source image data representing a still image of the transfer instrument. The visual guides help ensure optimal orientation of the transfer instrument within the image and also helps ensure that the camera is an optimal distance from the transfer instrument.

Optimizing the distance between the camera and the transfer instrument results in the transfer instrument occupying a desired proportion of the overall image size, such as locating the edges of the transfer instrument a pre-determined number of pixels away from each side boundary of the image. The system can then more efficiently crop the image to eliminate pixels that are located near the boundaries of the image and outside the edges of the transfer instrument. Cropping the image reduces the size of the image data file for faster transmission over a network and eliminates potential background "noise" near the edges of the image that could interfere with subsequent image processing and possibly be mistaken for transfer data.

Any suitable edge detection techniques can be employed to determine the edges of the transfer instrument and to facilitate image cropping. Edge detection can be utilized both before and after capturing an image of the transfer instrument. Before capturing an image, if all edges of the transfer instrument are not detected within the image data, the user computing device can display a notification or an indicator to the user notifying the user that the entirety of transfer instrument might not be within the boundaries of the image. Similarly, if all edges of the transfer instrument are not detected within a captured image, the user computing device can display a notification to the user and prompt the user to capture a replacement image.

To perform edge detection, in one embodiment, an Image Processing Module software component first converts the image to black and white pixels with each pixel having position data (e.g., X-Y coordinates) and a brightness value indicating how light or how dark the pixel is to be displayed. The Image Processing Module analyzes adjacent rows and columns of pixels to determine abrupt changes in the brightness values that represent edges of the transfer instrument. The Image Processing Module can streamline the edge detection process by starting the analysis at locations where edges are expected, such as positions proximal to the visual guide locations or positions located a certain number of pixels away from the edge of the image.

In one example of edge detection, three locations where edges are expected are examined to find a top left corner, a top right corner, and a bottom edge of the transfer instrument. For each of the corners or edges that are detected, a byte array is created, a histogram of the array is generated, and a binary black-and-white image is generated so that a horizontal line can be found for each of the top left corner, top right corner, and bottom edge. Similar operations are used to determine a vertical line for the top left and right corners. Following edge detection, the Image Processing Module can analyze the image data to ensure that the entire transfer instrument was captured within the image boundaries.

The user computing device or provider terminal that is being used to capture the image can also utilize anti-motion techniques to help ensure the image source device or camera is steady as images of the transfer instrument are captured. The result is a more sharp and more clear image. Any suitable anti-motion techniques can be utilized. In one example embodiment, an edge detection analysis is performed on successive image frames captured by the camera (e.g., every frame, every other frame, or every "x" number of frames to reduce processing requirements). If the edge detection analysis indicates that the locations of transfer instrument edges change by a predetermined threshold from one frame to the next (e.g., change by more than "x" number of pixels), the change is interpreted as unacceptable camera movement that could result in a poor image quality. The user computing device can then disable the image capture input function until movement falls within acceptable limits or display a notification to the user that camera movement should be eliminated as the movement could result in reduced image quality.

In yet another embodiment, the user computing device can include an integrated accelerometer that outputs positional data at periodic intervals of time. Changes in the positional data above a certain threshold can be interpreted as unacceptable camera movement that could result in a poor image quality. Again, the user computing device can then disable the image capture input function until movement falls within acceptable limits (e.g., the position data does not change above a predetermined threshold for a predetermined amount of time), or the user computing device can display a notification to the user recommending that camera the movement be reduced.

Once an image is captured, the image data can be converted and/or stored in one or more suitable image data formats, such as a JPEG compliant format, a TIFF format, a bitmap format, or a SVG image format. In some embodiments, the camera device captures images in a first image data format, such JPEG, that is then converted to another format with a smaller file size to facilitate transmission of the image data between computing devices. The provider computing system may convert the image data representing the transfer instrument into a binary interchange format, such as the DSTU X9.37-2003 file format, prior to transmitting the digitized transfer instrument to a third party, such as an automated clearing house.

Those of skill in the art will recognize that capturing an image is not the only method available for digitizing a physical transfer instrument. In other embodiments, the transfer instrument can be digitized in whole or in part using a document scanner or by entering transfer data into a GUI. For instance, a user can manually enter transfer data read from the transfer instrument into a GUI, and the system can generate file(s) that represent the transfer instrument, such as a data file (e.g., a .dat file), a hypertext language markup file (e.g., a html or xml file), a comma-separated value file (e.g., a .csv file), a portable document format file (e.g., a PDF file), or a template/standardized image representing a transfer instrument (e.g., a JPEG or TIFF image resembling generic check).

A hybrid of digitization methods can be used where, for example, not all of the transfer data can be determined by analyzing an image of the transfer instrument. In that case, the computing device display can generate and show a notification to the user stating that one or more elements of the transfer data could be not determined from the image if, for example, the transfer instrument is folded or damaged in a manner that conceals transfer data or handwritten transfer data is of poor quality and cannot be read. The computing device can also render a GUI that allows the user to input missing transfer data.

The system (i.e., a user computing device, provider terminal computing device, or a provider network computing device) can process source image data using a content recognition analysis to conduct an initial assessment regarding the quality of a digital image showing a transfer instrument. In particular, the initial assessment can determine readability of the transfer data contained on the transfer instrument. For example, the system can determine whether the product identification, the transfer value data, or other transfer data is readable such that it may be parsed or otherwise obtained and processed by the provider to execute the transfer. The initial quality assessment can be performed after a user captures all required images of the transfer instrument.

If the quality is confirmed, the user is prompted to confirm that the transaction is authorized and that electronic augmentations applied to the image are correct. Alternatively, the initial quality assessment can be performed after a first image of the transfer instrument is generated (i.e., a front side of the transfer instrument), and if the quality is confirmed as acceptable, the user computing device can generate a prompt instructing the user to capture a subsequent image of the transfer instrument (e.g., the back side of the transfer instrument).

If the image quality is not acceptable and not all of the transfer data can be determined, the user computing device generates a notice displayed to the user indicating, for example, that the image must be recaptured or that the electronic transfer instrument cannot be generated. The user computing device can optionally display on overlay on the transfer instrument image, such as the overlay shown in FIG. 10 stating "ERROR-Routing # not fully detected" and placing a circle and/or an arrow over the area of the image exhibiting an image quality problem. In this manner, a user can attempt to verify whether the transfer instrument is damaged, covered by a foreign object, or whether some other circumstance is precluding image capture.

While receiving a continuous video feed of dynamic image data, the user computing device captures single, static image of the transfer instrument in response to user selection of an input function that causes the user computing device to store a single frame of image data to transitory or non-transitory storage. The edge detection, content recognition, initial quality assessment, and enhancement operations (discussed below) are used to process static image data. The user can be required to capture multiple static images of a transfer instrument to ensure all the relevant transfer data is captured for generating the electronic transfer instrument.

Those of skill in the art will appreciate that other measures of image data quality can be used, such as determining the sharpness (i.e., contrasts in brightness between adjacent groups of pixels) or noise (i.e., random variations in brightness or color information) in the image data and only accepting images having predetermined thresholds for acceptable sharpness or noise. In this manner, the image quality assessment ensures that the image data is sufficient to permit transfer data to be extracted from the non-encoded components and that transfer data can be read from the encoded components.

In some cases, the image data may include significant levels of noise that interferes with reading transfer data. Noise reduction techniques can be applied to facilitate decoding and extraction of transfer data. Noise in digital images can include, without limitation, Gaussian noise, Rayleigh noise, salt and/or pepper noise, and impulse noise, among other types. Noise detection analyzes the color, brightness, or other properties of a pixel as compared to nearby pixels where pixels having characteristics that vary significantly compared to nearby pixels are taken as noise. When one or more images satisfying the image data quality threshold are captured an stored, the one or more images meeting the image data quality thresholds are then stored to the user computing device memory for use in creating the electronic transfer instrument.

Noise reduction techniques can include running an edge adaptive spatial low pass filter over an image while using an edge detector to protect some of the edge boundaries. Another way to improve signal to noise ratios ("SNR") is by temporally combining matching parts from two or more images by applying a temporal filter (e.g. a Motion Compensated Temporal Filtering). Gaussian noise reduction techniques can include mean filtering or Wiener filtering. Non-linear filters, such as median filtering and weighted median filtering, suppress noise without any identification. Bilateral filtering is a non-linear, edge-preserving, and noise-reducing smoothing technique that replaces the intensity value of each pixel with a weighted average of intensity values from nearby pixels. Spatial noise reduction techniques can include total variational regularization, non-local regularization, sparse representation, and low rand minimization techniques.

Transform domain de-noising techniques first transform the given noisy image to another domain, and then they apply a de-noising procedure on the transformed image according to the different characteristics of the image and its noise. Transform domain techniques include, without limitation, independent component analysis and MB3D. Neural networks can also be used for noise reduction where optimization techniques are employed, such as use of convolutional neural networks, multi-layer perception models, or deep learning networks.

The system utilizes content recognition techniques to detect and convert image data to content elements, such as individual characters, letters, numbers, symbols, or images within the transfer instrument to ensure the transfer data can be read. That is, within the image data, the system discerns and identifies individual characters. The system then utilizes a segment analysis to group content elements by transfer instrument component so various elements of the transfer instrument can be identified, such as recognizing the product identification, routing data, or transfer value data whether handwritten or typed.

To illustrate image processing and content recognition, the content recognition analysis might detect content elements that include a currency symbol adjacent to a series of numbers. The segment analysis then utilizes geometric segmentation techniques to detect that the currency symbol and numbers are within a quadrilateral located in a pixel position where the courtesy transfer value is expected to be found. The system, therefore, positively identifies the content elements as representing the transfer value data. Continuing with the foregoing example, the content recognition analysis might also detect a series of content element as adjacent letters proximal to a fraction, such as "35/100." The segment analysis then detects that the content elements are located immediately above an elongated line and proximal to the aforementioned quadrilateral where the legal value data is expected. In that case, the system identifies the letters as representing the legal transfer value data.

Having extracted various elements of transfer data, the system can perform error checks by, for instance, comparing the legal transfer value data against the courtesy transfer value data to determine if the values are the same. If the values do not match, the system can display an error notification on a display of the end user computing device that optionally includes an overlay graphically identifying the discrepancy. If the values match, processing continues and the extracted transfer element can be used to generate an electronic transfer instrument later posted to the provider system. In this manner, the system can automatically detect various transfer elements without the need for manual end user input.

The segment analysis alone or in combination with an edge detection analysis can also extract known features of the transfer instrument associated with components of the transfer instrument. In one embodiment, the visual guide shown in FIG. 9 is used to ensure that a transfer instrument is centered near a particular location within image data at the time of image capture. The provider system is programed with an expected location for certain transfer data, such as the target identification to receive the transfer. The target identification might be expected to be located proximal to, or within a certain number of pixels from, the center of a transfer instrument image. The system then analyzes pixels proximal to the expected location to recognize matrices of pixels corresponding to the text string "pay to the order of." When detected, the system recognizes that the pixels to the right of the string likely include the target identification. As another example, in some cases it is known that the text string "endorse here" always appears on the rear, or second, side of the transfer instrument such that when that text is recognized, the system designates the image data as representing the second side of a transfer instrument.

Transfer Instrument Security and Validation

Transfer Instrument Processing System

An example system for securing and validating electronic transfer instruments and detecting errors is shown in FIG. 13. The system includes a Secure Agent software engine that processes electronic transfer instruments, transfer activity data, system configuration data, and end user data to detect potential errors or instances of fraud collectively referred to herein as "transfer tags." The Secure Agent utilizes artificial intelligence and machine learning technology to determine a Secure Score that represents the likelihood an electronic transfer instrument is fraudulent or contains errors such that the underlying transfer should not be processed and "posted" by the Deposit Platform. The Deposit Platform receives posting data from the Transfer Instrument Process Engine and completes the transfers by posting the transfers to a product account.

The system includes a Deposit Service Router implemented by APIs and supporting logic that determine subsequent processing path of an electronic transfer instrument according to data stored to the Parameters and Thresholds database. An electronic transfer instrument can be processed using the Legacy Path consisting of conventional manual review techniques to detect transfer tags with an electronic transfer instrument.

In addition, or as an alternative, to the Legacy Path, a transfer instrument can also be processed according to the Onboard Path or the Active Path. When processed through the Onboard Path or the Active path, the transfer instrument and the underlying transfer is subject to automated processing by the Secure Agent. Relative to processing through the Legacy Path, processing through the Onboard Path or Active path can be seamless to the user. That is, regardless of the processing path, the user can be presented with the same or similar user interfaces and notifications, and the user is required to enter the same or similar inputs.

The Onboard Path is implemented as a training mode where the Secure Agent analyzes live production data to train one or more neural networks that implement the artificial intelligence technology of the Secure Agent. For the Onboard Path, the Transfer Instrument Process Engine generates historical transfer activity data, but transfer data is not transmitted to the Deposit Platform for posting. In other words, the Onboard Path is not utilized to complete the underlying transfers. The Active Path on the other hand, processes transfer instruments using the Secure Agent and transmits the transfer data to the Deposit Platform for posting and completion of the underlying transfer.

The Onboard Path or the Active Path can be selected by the Deposit Service Router based on the relative performance or efficacy of the Secure Agent in detecting transfer tags. Path selection can be illustrated with the following simplified examples. In one embodiment, the system determines a proportion of transfer tags that the Secure Agent is able to detect over a set of transfer instruments. For example, a set of one-hundred (100) transfer instruments might be known to include ten (10) transfer tags, as determined from an analysis of the transfer instruments, transfer data, transfer activity data, and end user data.

The provider can establish an active path threshold such that when the Secure Agent can detect nine (9) out of the ten (10) known transfer tags, the Secure Agent is deemed to be performing sufficiently to transition from the Onboard Path to the Active Path. The active path threshold is stored to the Parameters and Thresholds database shown in FIG. 13. When the active path threshold is met, the Deposit Service Router can transition processing from the Onboard Path to the Active Path.

The active path threshold can also be determined with reference to the performance of the Legacy Path. To illustrate with reference to the foregoing example, the Legacy Path might result in detecting seven (7) of the ten (10) known transfer tags in the set of one-hundred (100) transfer instruments. In that case, when the Secure Agent can also detect seven out of ten transfer tags (e.g., a success rate of 70%), then the Deposit Service Router transfers from the Onboard Path to the Active Path.

When analyzing transfers, the Secure Agent compares the determined Secure Score against a Secure Threshold value stored to the Parameters and Thresholds database. In the Active Path, when the Secure Score meets or exceeds the Secure Threshold, the underlying transfer proceeds to the Deposit Platform after analysis by the Transfer Instrument Processing Engine. The user computing device displays a transfer pass indicator or notification indicating that the transfer succeeded.

For the Active Path, if the Secure Score does not meet or exceed the Secure Threshold, the transfer is flagged. When a transfer is flagged, the system displays a transfer fail indicator or notification on the end user computing device indicating that the transfer was not completed. The transfer fail notification can also include instructions for contacting the provider to attempt to resolve the transfer tag(s).

The Secure Threshold can represent a calculated likelihood that a transfer instrument is, or is not, fraudulent or contains errors. For instance, the Secure Threshold can be set to "99%," which represents a 99% probability that the transfer does not include any transfer tags. In that case, a transaction is sent to the Deposit Platform only when the Secure Agent determines a Secure Score of 99% indicating at least a 99% probability that the underlying transaction is not fraudulent or erroneous. Those of skill in the art will appreciate that the foregoing example is not intended to be limiting, and the Secure Score need not always represent a percentage between zero and one-hundred. In other embodiment, the Secure Score can be a scaled or normalized value falling within zero to one, or some other numeric range.

The Secure Threshold can be predetermined by the provider according to a variety of factors, such as the transfer value data of an electronic transfer instrument. Application of the Secure Threshold can be better understood with reference to the following simplified, non-limiting examples where the Secure Threshold represents a probability that a transfer instrument is not fraudulent or contains errors. The provider can set the Secure Threshold to "95%" for transfer instruments having transfer value data of $1,000 or less and a "99%" for transfer instruments having a value of greater than $1,000. In this manner, the provider demands a higher degree of confidence and accuracy for larger transfer amounts. That is, for transfers of more than $1,000, the provider requires a 99% probability that the transfer instrument is not fraudulent or erroneous, but requires only a 95% degree of confidence for lower transfer amounts.

When the Secure Score meets the Secure Threshold, the electronic transfer instrument is sent to the Transfer Instrument Processing engine to generate the required posting data format for posting. The posting data and the electronic transfer instrument are sent to the Deposit Platform for real-time or batch processing. For real-time processing, the transfer is posted immediately such that the transfer data is added to the Transfer Activity Database for the particular target end user that received the transaction. In particular, the transfer value data is aggregated with the resource availability data in the Transfer Activity Database. In the context of a check deposit, the result is that most or all of the funds would be immediately available for use.

With respect to batch processing, the electronic transfer instrument is stored in an "X9" file format along with batch file data from other transfers. The Deposit Platform periodically (e.g., once per day) processes the transfers in a single batch. Some or all of the transfer value data can be posted to the end user's resource availability data in the Transfer Activity Database prior to the batch processing. In the context of a check deposit, that means some of the funds from the check are made available through a "memo post" prior to the batch processing. For the Legacy Path, the amount of funds made available is typically subject to strict limits of low value to mitigate the risk to the provider while transfers undergo a manual review.

Significantly, the automated processing capability provided by the Secure Agent permits real-time posting and the memo posting of larger transaction amounts. The provider can automatically and immediately have reliable data indicating that a transaction is not fraudulent and does not include errors such that there is a low risk in completing the transfer or making most of the funds available for an end user. This is an improvement over conventional Legacy Path operation where transfers often must be placed on a hold while a manual review is conducted.

Secure Agent Operation

The Secure Agent determines the Secure Score utilizing a wide variety of data from the transfer instrument, the transfer data, the transfer activity database, the system configuration data, and the end user data. When the Secure Agent is implemented by neural networking technology, the input from the various data sources are fed through a neural network where weights are assigned to the inputs based on the relative significance of a given input in influencing the output Secure Score.

The Secure Agent can be implemented with neural networks adapted to perform predictive analysis. Examples include, but are not limited to, various deep-learning techniques and specific architectures that include, but are not limited to: (i) LSTM network architecture; (ii) deep-learning, cyclic recurrent neural networks; (iii) an Elman recurrent neural network; (iv) convolutional neural networks; (v) multilayer perceptron networks; (vi) TensorFlow networks; (vii) MxNet networks; (viii) PyTorch networks; (ix) Keras networks; and (x) Gluon networks.

Operation of the Secure Agent can be better understood with reference to the following simplified, non-limiting examples. In one embodiment, the user computing device establishes a secure connection to the provider system. The end user computing device transmits authentication data, system configuration data, and geolocation data to the provider system, and the end user identification and the end user computing device are authenticated using techniques discussed above. For example, the provider system can compare a device identification received from the end user computing device against known device identification data stored to the provider system for a computing device registered to a particular user. Similarly, the provider system can compare geolocation data received from the end user computing against geolocation data stored to the provider system, such as a geolocation for the end user's home or all geolocations from which the end user computing device accessed the provider system in the past year. The results of such verification techniques can be significant indicia that a subsequent transaction is not fraudulent and can thus be factored into an analysis conducted by the Secure Agent.

The end user performs an image capture for a transfer instrument. The Image Processing Module shown in FIG. 13 analyzes the captured transfer instrument image and compares image quality metrics against predetermined image quality thresholds stored to the Parameters and Thresholds database. The transfer instrument image is also analyzed to determine that all required elements of transfer data were detected where a list of required transfer data elements is also stored to the Parameters and Thresholds database.

The Image Processing Module can also detect and log irregularities in the transfer instrument image data. For instance, the segment and content recognition analysis may show that a provider logo is located on a second side (back) of the transfer instrument whereas the logo was expected on the first side (front) of the transfer instrument. Or the segment that includes the transfer value data might be located on the top of the transfer instrument whereas it was expected in the middle of the transfer instrument. As another example, the signature data might not match known signature data patterns for a particular user. The Image Processing Module stores the irregularities as flagged input data within the transfer data that is passed to the Secure Agent.

As a further analysis for possible errors or instance of fraud, the Secure Agent can retrieve elements of end user data that can be verified against transfer data or augmentation data included as part of an electronic transfer instrument. The provider system can include an end user database that stores end user data. After capturing an image of a transfer instrument, the system compares the user identification determined from the provider system to the transfer data on the transfer instrument, such as a user identification adjacent to a content element string "pay to the order of." If the user identifications match, the system proceeds with creating an electronic transfer instrument. If the user identification do not match, the system can display a notification to the user indicating that the user identification could not be validated. The system can also store the non-match as flagged input data utilized as an input to the neural network of the Secure Agent.

The Secure Agent receives the electronic transfer instrument and transfer data and optically receives or captures transfer activity data, end user data, flagged input data, and system configuration data from the provider system or the end user computing device. The foregoing data is analyzed to determine the inputs to the neural network. As one example, any flagged OCR data is provided as an input to the neural network with a particular weight that varies depending on the significance of the input. If a misplaced provider logo image is known, based on historical data to correspond to higher likelihoods of fraud, then that input is assigned a higher weight for processing by the neural network.

In another example, the routing data is used to determine the source provider identification, which is the enterprise that is the source of a transfer. The source provider identification is compared against a list of providers that demonstrate higher instance of fraudulent transfers. If there is a match—i.e., the source provider is known to exhibit higher instances of fraud-then the routing data is assigned a higher weight as an input to the neural network.

In other embodiments, the Secure Agent uses a combination of data types, such as geolocation data from the end user computing device along with transfer activity data. As one example, an end user computing device might be used only at periodic intervals (e.g., the 3rd day of every month) while in a specific location (e.g., the end user's home) to initiate transfers of a certain amount (e.g., $100). Thus, if the transfer data represented a much larger value and a transfer was being performed from geolocation location in a state other than the end user's home state, these factors can be assigned higher weights in the neural networking analysis.

Those of skill in the art will appreciate that these examples are not intended to be limiting, and numerous other types of data are processed by the Secure Agent to generate a Secure Score. The accuracy if the Secure Score is continuously refined by comparing the Secure Score to known instance of transfer tags observed, for example, using the Legacy Path. The parameters (e.g., node weights and formulas) of the Secure Agent are continuously adjusted to improve the accuracy of transfer tag detection.

After a transaction is processed, the results of the analysis by the Secure Agent are stored to a historical secure agent database record is created and stored to the provider system or a third party storage facility. The historical secure agent database record can include the results of whether a transfer tag was detected along with the Secure Score and transfer data. In some embodiments, the system retrieves the historical secure agent database record to perform a labeling analysis. The labeling analysis determines whether transfer tags were present in a particular transaction but not caught by the Secure Agent. The historical labeling data is stored to the historical resource initialization database record to create a training data set.

The training data set is input to neural network software applications and machines that implement the Secure Agent. The outputs of the neural network software applications are evaluated to determine whether the outputs match the historical labeling data within pre-defined error rates. The weighting coefficients of the neural network software applications are adjusted to reduce the error rates, and the process is run iteratively to train the neural network. The training can be done, for example, on a non-production network or server that is not processing current user data. Once the neural network software applications are trained in a non-production environment, the software applications are uploaded to a production environment campaign manager to process user data in real-time.

The system can perform an error detection analysis to detect potential errors in the transfer data. For example, the system might determine that the source identification data has a value of "customer 1" and the transfer value data yields a value of "$10." The user computing device can display a GUI that prompts the user to enter expected source identification data and expected transfer value data. The system compares the expected values against the values determined through the content recognition analysis or decoding of the encoded regions. A match between the user-entered expected data values and the determined data values is taken as an indicator that the transfer data was properly determined through the content recognition analysis or through decoding the encoded regions. If the expected data values and the determined data values do not match, the transfer can be automatically terminated, or the user can be notified and prompted to confirm whether the transfer is still authorized.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system to secure electronic transfer instruments comprising a first computer including at least one processor and a memory device storing data and executable code that, when executed, causes the at least one processor to:
- transmit system configuration data to a network computer that compares the system configuration data to stored system configuration data and returns a database entry and transfer activity;
- activate a camera coupled with the computer, wherein the camera captures image data that comprises a transfer instrument image;
- read and convert the image data to machine encoded content elements to identify text characters on the transfer instrument image;
- using a neural network, segment the transfer instrument image into a plurality of components, wherein at least one of the components comprises transfer data, wherein the neural network executes a clustering analysis, wherein the neural network comprises one of a convolutional neural network (CNN), a Hopefield network, a Helmholtz Machine, a Kohonen Network, Sigmoid Net, a Self-Organizing Map, or a Centroid Neural Network;
- extract the transfer data from the transfer instrument image, wherein the processor (i) reads machine encoded content elements from the component, and (ii) converts groups of machine encoded content elements to transfer data elements; and
- secure the transfer instrument by using the transfer data elements, the database entry, and the transfer activity to determine a Secure Score that is compared to Secure Threshold to generate a pass indicator or a fail indicator, wherein:
  - when the pass indicator is generated, the transfer data is stored as transfer activity data, and
  - when the fail indicator is generated, the transfer data is not stored as transfer activity data.

2. The system of claim 1, wherein the neural network is used to secure the transfer instrument.

3. The system of claim 2, wherein the neural network comprises the CNN.

4. The system of claim 2, wherein the CNN comprises at least three layers.

5. The system of claim 1, wherein, prior to causing the processor to create the electronic transfer instrument, the transfer instrument image is enhanced using one or a combination of binarization, de-skewing, de-warping, or despeckling the transfer instrument image.

6. The system of claim 1, wherein the executable code, when executed, causes the at least one processor to:
- utilize the transfer data, client data, and transfer activity data to generate known labeling data;
- generate an error rate by comparing the pass indicator or the fail indicator to the known labeling data; and
- train the neural network by adjusting one or more neural network weighting coefficients to reduce the error rate.

7. A system to secure electronic transfer instruments comprising a first computer including at least one processor and a memory device storing data and executable code that, when executed, causes the at least one processor to:
- load transfer activity data;
- load image data generated by a camera coupled with a client computer, wherein the image data comprises a transfer instrument image;
- read and convert the image data to machine encoded content elements to identify text characters on the transfer instrument image;
- convert groups of machine encoded content elements to transfer elements;
- using a neural network, secure the transfer instrument by using the transfer elements and the transfer activity data to determine a Secure Score that is compared to Secure Threshold that results in a transfer pass indicator or a transfer fail indicator that is transmitted to the client computer;
- utilize transfer data, client data, and the transfer activity data to generate known labeling data;
- generate an error rate by comparing the transfer pass indicator or the transfer fail indicator to the known labeling data; and
- train the neural network by adjusting one or more neural network weighting coefficients to reduce the error rate.

8. The system of claim 7, wherein the neural network comprises an architecture selected from one of: (i) a long short term memory; (ii) a recurrent networks; (iii) an Elman recurrent network; (iv) a convolutional neural network (CNN); (v) a multilayer perceptron network; (vi) a TensorFlow network; (vii) a MxNet networks; (viii) a PyTorch network; (ix) a Keras network; or (x) a Gluon network.

9. The system of claim 7, wherein: the transfer data comprises transfer value data, and the Secure Threshold increases when the transfer value data increases.

10. The system of claim 7 further comprising a Deposit Service Router and Parameters and Threshold Database, wherein:
- the Parameters and Threshold Database comprises an active path threshold; and the Deposit Service Router passes the transfer instrument through an Active Path when the active path threshold is met or an Onboard Path when the active path threshold is not met.

11. The system of claim 7, wherein: a second neural network is used to read and convert the image data to machine encoded content elements, wherein the second neural network comprises a network architecture selected from one of a convolutional neural network (CNN), a Hopefield network, a Helmholtz Machine, a Kohonen Network, Sigmoid Net, a Self-Organizing Map, or a Centroid Neural Network.

12. The system to secure electronic transfer instruments of claim 7, wherein, prior to causing the processor to create the electronic transfer instrument, the transfer instrument image is enhanced using one or a combination of binarization, de-skewing, de-warping, or de-speckling the transfer instrument image.

13. A system to secure electronic transfer instruments comprising a first computer including at least one processor and a memory device storing data and executable code that, when executed, causes the at least one processor to:

load transfer activity data;

load image data generated by a camera coupled with a client computer, wherein the image data comprises a transfer instrument image;

read and convert the image data to machine encoded content elements to identify text characters on the transfer instrument image;

using a neural network, segment the transfer instrument image into a plurality of components, wherein at least one of the components comprises transfer data, wherein the neural network executes a clustering analysis, wherein the neural network comprises one of a convolutional neural network (CNN), a Hopefield network, a Helmholtz Machine, a Kohonen Network, Sigmoid Net, a Self-Organizing Map, or a Centroid Neural Network;

extract the transfer data from the transfer instrument image, wherein the processor (i) reads machine encoded content elements from the component, and (ii) converts groups of machine encoded content elements to a transfer element; and secure the transfer instrument by using the transfer element and the transfer activity data to detect transfer tags, wherein: (i) when the transfer tags are detected, the transfer data is sent to a Deposit Platform, and (ii) when the transfer tags are not detected, the transfer data is not sent to the Deposit Platform.

14. The system of claim 13, wherein the neural network is used to secure the transfer instrument.

15. The system of claim 13 further comprising a Deposit Service Router and Parameters and Threshold Database, wherein:

the Parameters and Threshold Database comprises an active path threshold; and the Deposit Service Router passes the transfer instrument through an Active Path when the active path threshold is met or an Onboard Path when the active path threshold is not met.

16. The system of claim 13, wherein the executable code, when executed, causes the at least one processor to:

utilize the transfer data, client data, and transfer activity data to generate known labeling data;

determine an error rate of the neural network based at least in part on the known labeling data; and train the neural network by adjusting one or more neural network weighting coefficients to reduce the error rate.

* * * * *